United States Patent [19]
Ohnishi et al.

[11] Patent Number: 5,434,479
[45] Date of Patent: Jul. 18, 1995

[54] FULL-BRIDGE INVERTER FOR DISCHARGE LAMP LIGHTING DEVICE WITH VARIED TRANSISTOR ZERO VOLTAGE PERIOD

[75] Inventors: Masahito Ohnishi; Shozo Kataoka; Kazuo Yoshida, all of Osaka, Japan

[73] Assignee: Matsushita Electric Works, Ltd., Osaka, Japan

[21] Appl. No.: 124,636

[22] Filed: Sep. 22, 1993

[30] Foreign Application Priority Data

Sep. 22, 1992 [JP] Japan ................. 4-252521
Sep. 25, 1992 [JP] Japan ................. 4-255260

[51] Int. Cl.⁶ ........................... H05B 37/02
[52] U.S. Cl. ................. 315/209 R; 315/224; 315/307; 363/17
[58] Field of Search ......... 315/209, 224, 307, DIG. 7, 315/219; 363/17, 132

[56] References Cited

U.S. PATENT DOCUMENTS

| | | | |
|---|---|---|---|
| 3,750,004 | 7/1973 | Walker. | |
| 4,370,600 | 1/1983 | Zansky | 315/209 R |
| 4,504,895 | 3/1985 | Steigerwald | 363/17 |
| 4,734,624 | 3/1988 | Nagase et al. | 315/DIG. 7 |
| 4,855,888 | 9/1989 | Henze et al. | 363/17 |
| 4,931,185 | 9/1990 | Schulten et al. | 363/17 |
| 4,935,669 | 6/1990 | Nilssen | 315/105 |
| 5,027,040 | 6/1991 | Ikeda et al. | 315/219 |
| 5,087,859 | 2/1992 | Blankers | 315/209 R |
| 5,166,579 | 11/1992 | Kawabata et al. | 315/209 R |

FOREIGN PATENT DOCUMENTS

| | | |
|---|---|---|
| 0390285 | 3/1990 | European Pat. Off.. |
| 0002306 | 6/1980 | Japan ............. 315/209 R |
| 166706 | of 1987 | Japan. |
| 643318 | of 1989 | Japan. |

OTHER PUBLICATIONS

"Off-Line Application of the Fixed-Frequency Clamped-Mode Series Resonant Converter"; Juan A. Sabate and Fred C. Y. Lee; IEEE Transactions on Power Electronics, vol. 6, No. 1, Jan. 1991.

Primary Examiner—Robert J. Pascal
Assistant Examiner—Darius Gambino
Attorney, Agent, or Firm—Leydig, Voit & Mayer

[57] ABSTRACT

A discharge lamp lighting device employs first and second series circuits, each series circuit including two switching elements and a connecting point located therebetween. The first and second series circuits are both connected in parallel across a DC voltage source. A load circuit, including a discharge lamp, is connected between the two connecting points in the first and second series circuits. ON/OFF timing of the switching elements in the first series circuit varies between in-phase and 180 degrees out-of-phase from ON/OFF timing of the switching elements in the second series circuit. The ON period ratio of the switching elements is different in at least one of the first and second series circuits. The device allows dimming of the discharge lamp over a wide range, and lighting of the discharge lamp with a small supplied power.

17 Claims, 19 Drawing Sheets

FULL-BRIDGE INVERTER FOR DISCHARGE LAMP LIGHTING DEVICE WITH VARIED TRANSISTOR ZERO VOLTAGE PERIOD

BACKGROUND OF THE INVENTION

This invention relates to a discharge lamp lighting device employing, in particular, an inverter device for converting a DC power into an AC power.

DESCRIPTION OF RELATED ART

In the discharge lamp lighting device employing the inverter circuit of a half bridge arrangement, conventionally, two switching elements such as MOSFETs are connected in series to both ends of a DC power source E, and a load circuit consisting at least of a resonance circuit of an inductor and capacitor and a discharge lamp as a load is connected through a DC component cutting capacitor to both ends of one of the two switching elements. In this case, the switching elements are alternately turned ON and OFF under control of a controlling circuit to convert a voltage of the DC power source E into a high frequency voltage to be supplied to the discharge lamp, and the discharge lamp is subjected to a high-frequency lighting. Further, in rendering the power supplied to the load, that is, an output of the inverter circuit to be variable in this discharge lamp lighting device, it suffices the purpose to have switching frequency of the two switching elements varied, so that, in other words, the discharge lamp can be subjected to a dimming control.

Here, in an event where the switching frequency of the respective switching elements is set to be higher than a resonance frequency of the resonance circuit, the switching frequency varied to be lower will approach the resonance frequency so that a voltage occurring across the capacitor will rise, and the power supplied to the discharge lamp is increased, whereas the switching frequency varied to be higher will separate from the resonance frequency, to cause the voltage across the capacitor lowered and the power supplied to the discharge lamp to be decreased.

In U.S. Pat. No. 4,504,895 to Steigerwald, there has been disclosed an inverter circuit substantially of the same function as that in the foregoing known device, and a discharge control for an X-ray tube is shown to be realized by varying operating frequency of a converter.

In the case of this known inverter circuit, however, there arises a problem that, in obtaining a DC voltage through a rectification and smoothing of AC source voltage, the switching frequency of the switching elements varied will cause a high frequency to leak to the side of the AC source side. While a filter is provided for preventing high frequency component from leaking to the AC source side at input end or the like of a diode bridge for rectifying the AC source voltage, the use of such filter capable of eliminating the high frequency component even upon variation of the operating frequency of the switching elements causes another problem to arise in rendering circuit design to become more complicated. Further, when the operating frequency of the inverter circuit is varied in supplying the source voltage to the discharge lamp as a load, emitted light of the discharge lamp is also caused to be varied in the frequency, and there arises a further problem that such other devices as infrared remote controllers are ill influenced thereby.

Further, in an event where HID lamp is employed as the discharge lamp, an acoustic resonance phenomenon will be apt to occur due to a variation in output frequency, which entails destruction of the discharge lamp or the like. That is, when the operating frequency of the inverter circuit is made high, it becomes highly possible that the operating frequency is made coincide with a frequency at which the HID lamp happens to acoustically resonate.

There has been disclosed a countermeasure against the above problem, in a thesis titled "Off-Line Application of Fixed-Frequency Clamped Mode Series Resonant Converter" by J. A. Sabaté et al., IEEE Transaction on Power Electronics, Vol. 6, No. 1, January, 1991, according to which two series circuits respectively of two switching elements are connected in parallel with a DC power source, a load circuit including at least an LC resonance circuit and a load is connected between both connecting points of the respective switching elements of the two series circuits, and the switching elements in the respective series circuits are alternately switched ON and OFF so as not to be simultaneously ON while causing ON/OFF phase of the switching elements in one series circuit varied with respect to ON/OFF timing of the switching elements in the other series circuit. Such arrangement has been disclosed in, for example, U.S. Pat. No. 4,855,888 to Henze et al.

Further, in U.S. Pat. No. 4,951,185 to Schutten et al., there has been disclosed a circuit which is stably operated with the operating frequency of switching means made variable so long as the frequency is within an operatable frequency range and, when the frequency is adjacent to boundaries of the operatable frequency range, output voltage of the circuit is controlled by varying operational phase. Further in U.S. Pat. No. 3,750,004 to Walker, there has been disclosed a device capable of performing a protective operation against any overcurrent flowing during the foregoing output control with the operational phase varied, in which the protective operation is carried out for the period in which the overcurrent flows without reducing the output voltage in all phase of the inverter circuit, by shortening operation time of respective power switching elements only through which the overcurrent is flowing by means of a static inverter circuit of a step-wave as the protective operation.

In these known arrangement, however, there has been involved such problem that, when they are employed in the discharge lamp lighting device, the discharge lamp lighting cannot be maintained when the power supplied to the discharge lamp is reduced under conditions of low temperature so that the lamp will fail or flicker.

European Patent Publication No. 0 390 285 discloses an arrangement in which, as a measure of eliminating the failing or flickering of the discharge lamp at the time of low light flux upon limitation of the output power to the lamp, a DC current at a level capable of maintaining the discharging in the low light flux state is superposed on the high frequency AC current to the discharge lamp, and a stable lighting in the low light flux state is enabled. Further, Japanese Patent Publication No. 64-3318 discloses another measure for stabilizing the lighting with the superposition of a direct current so as to prevent the flickering by migration.

In any one of the foregoing known arrangement, however, there still remains a problem that, in the event when the arrangement is provided as the discharge lamp lighting device, the dimming range for the discharge lamp is restricted due to that the discharge lamp is apt to fail in the state where the power to be supplied to the discharge lamp is limited to be small under the low temperature conditions.

SUMMARY OF THE INVENTION

A main object of the present invention is, therefore, to provide a discharge lamp lighting device which has overcome the foregoing problems, and is capable of regulating the power supplied to the discharge lamp without varying the frequency, stably operating even in a state where the power supplied to the discharge lamp is limited to be small, and realizing the dimming of the discharge lamp in a relatively wide range.

According to the present invention, this object can be established by means of a discharge lamp lighting device in which two series circuits respectively of two switching elements are connected in parallel to a DC power source, a load circuit of at least an LC resonance circuit and a discharge lamp is connected between both connecting points of the respective switching elements in the two series circuits, and the respective switching elements in both series circuits are alternately turned ON and OFF so as not to be simultaneously ON, while, with respect to ON/OFF timing of the switching elements in one series circuit, the ON/OFF timing of the switching elements in the other series circuit is made variable in a range from in-phase state to 180 degrees' phase-slid state, characterized in that ON period ratio of the switching elements in at least one series circuit is made mutually different.

Other objects and advantages of the present invention should be made clear in following description of the present invention detailed with reference to accompanying drawings.

While the present invention shall be detailed in the followings with reference to the embodiments shown in the accompanying drawings, it should be appreciated that the intention is not to limit the invention only to such embodiments as shown but to include all alterations, modifications and equivalent arrangements possible within the scope of appended claims.

DETAILED DESCRIPTION OF THE PREFERRED EMBODIMENTS

Figure 1:
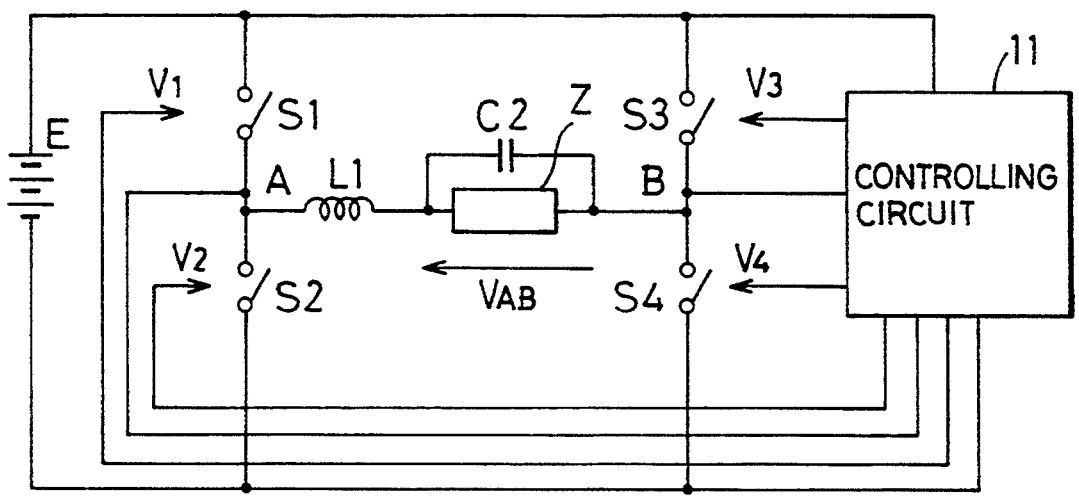
FIG. 1 shows in a circuit diagram an embodiment of the discharge lamp lighting device according to the present invention.

Referring to FIG. 1 there is shown an embodiment of the discharge lamp lighting device according to the present invention, in which a DC voltage is employed as converted into an AC voltage. In the present instance, two series circuits respectively of two switching elements S1 and S2 or S3 and S4 are connected in parallel to a DC power source E, and a load circuit comprising a series resonance circuit of an inductor L1 and a capacitor C2 and a discharge lamp Z parallel to the capacitor C2 is connected across a connecting point between the switching elements S1 and S2 and the other connecting point between the switching elements S3 and S4 of these two series circuits. That is, the present discharge lamp lighting device is provided in a so-called full bridge arrangement in which the switching elements S1–S4 are in a bridge connection, in which generally diagonally opposing pairs of the switching elements S1 and S4 and S2 and S3 are alternately turned ON and OFF by means of a control circuit 11, and an AC current is supplied thereby to the load circuit. And the switching elements S1–S4 are considered here as to be MOSFETs having parasitic diodes making the current flow in reverse direction.

Figure 2:
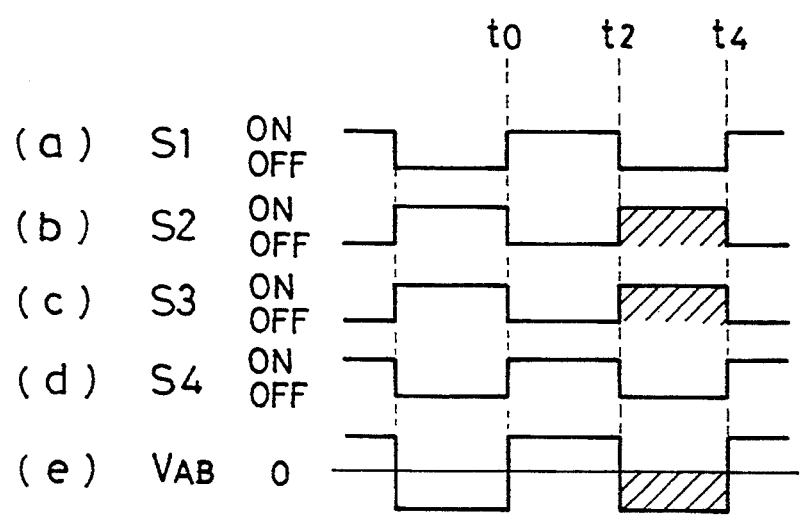
FIGS. 2 to 10 are explanatory waveform diagrams for various working aspects of the device shown in FIG. 1.

In the foregoing discharge lamp lighting device, it is assumed that, as shown in FIG. 2, control signals V1 and V4 from the control circuit 11 to the switching elements S1 and S4 are in high level while control signals V2 and V3 to the switching elements S2 and S3 are in low level at a time t0. At this moment, the switching elements S1 and S4 are turned ON as shown by waveforms (a) and (d) of FIG. 2, while the other switching elements S2 and S3 are turned OFF as shown by waveforms (b) and (c) of FIG. 2, and a current is caused to flow from the DC power source E through the switching element S1, inductor L1, capacitor C2, discharge lamp Z and switching element S4, and the current is fed to the load circuit. At a next time t2, the control signals V1 and V4 are in the low level while the control signals V2 and V3 are in high level, upon which the switching elements S1 and S4 are turned OFF as the waveforms (a) and (d) show, while the switching elements S2 and S3 are turned ON as the waveforms (b) and (c) show. Now, in an event when switching frequency of the discharge lamp lighting device is made in a range higher than a resonance frequency of the load circuit consisting of the inductor L1, capacitor C2 and a load, energy accumulated in the resonance circuit causes a current to flow through a path of the inductor L1, parallel connection of the capacitor C2 and discharge lamp Z, parasitic diode of the switching element S3, DC source E and parasitic diode of the switching element S2. From a time when the current in the resonance circuit is made zero, the switching elements S2 and S3 are ON in positive direction, and the current is made to flow from the source E, in a direction reverse to that has been flowing, through a path of the switching element S3, parallel connection of the capacitor C2 and discharge lamp Z, inductor L1 and switching element S2.

When a time t4 is reached, the control signals V1 and V2 of the control circuit 11 are in the high level again, similar to those at the time t0, while the control signals V2 and V3 are in the low level, so that the switching elements S1 and S4 will be ON and the other switching elements S2 and S3 will be OFF. At this time, too, an energy accumulated in the resonance circuit causes a current to flow through a path of the inductor L1, parasitic diode of the switching element S1, DC source E, parasitic diode of the switching element S4 and parallel connection of the capacitor C2 and discharge lamp Z. Also, from the time when the current in the resonance circuit is made zero, the current flows through a path of the DC source E, switching element S1, inductor L1, parallel connection of the capacitor C2 and discharge lamp Z, and switching element S4, and the power supply is made to the load circuit. So long as the discharge lamp lighting device is in the constant operation, the load current is supplied in positive direction through the switching elements S1 and S4 also at the time t0, after the current flow through the parasitic diodes of the switching elements S1 and S4. Further, such a structure is also possible to connect diodes respectively in reverse parallel to the switching elements S1 to S4 of a bipolar transistor and cause the energy in the resonance circuit to flow.

Figure 3:
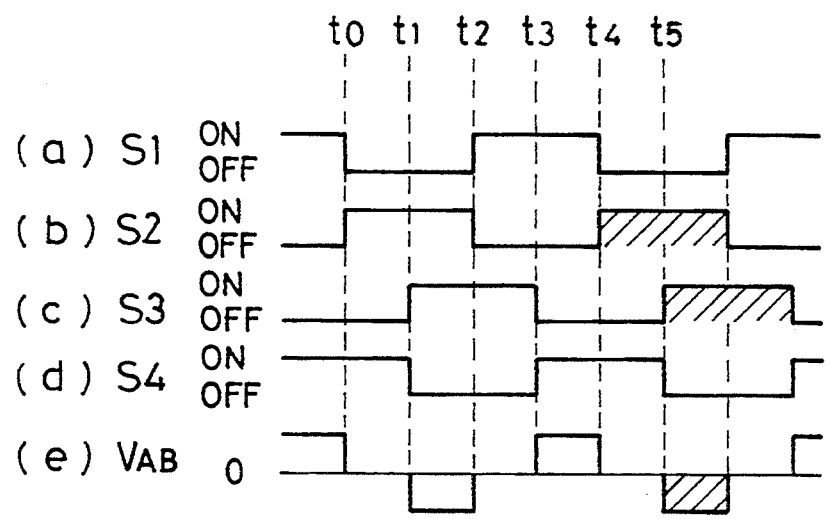

Further, as shown in FIG. 3, the arrangement may be so made that a time lag is involved between ON/OFF timing of the series connection of the switching elements S3 and S4, as seen in waveforms (c) and (d), and ON/OFF timing of the other series connected switching elements S1 and S2, as seen in waveforms (a) and (b), and the two series circuits of S1, S2 and S3, S4 connected in parallel to both ends of the DC power source E will be alternately turned ON and OFF. Provided here that the switching frequency is set to be higher than the resonance frequency as in the foregoing, the switching elements S2 and S4 are ON at the time t0, as shown by the waveforms (b) and (d), while the switching elements S1 and S3 are OFF, as shown by the waveforms (a) and (c), and no voltage is applied to the load circuit. When the time t1 is reached, the switching element S3 turns ON while the switching element S4 turns OFF as seen in the waveforms (c) and (d), whereby the load current is supplied from the source E through the switching element S3, parallel connection of the capacitor C2 and discharge lamp Z, inductor L1, and switching elements S2. At the time t2, as seen in the waveform (b), the switching element S2 turns OFF and the applied voltage to the load disappears. At the same time when the switching element S2 turns OFF, the control signal V1 is applied from the control circuit 11 so as to turn the switching element S1 ON, as seen in the waveform (a). In this case, the energy accumulated in the resonance circuit causes the load current to flow in the same direction as that which has been flowing, through a path of the inductor L1, parasitic diode of the switching element S1, parasitic diode of the switching element S3, capacitor C2 and discharge lamp Z.

At the time t3, as seen in the waveform (c) of FIG. 3, the switching element S3 turns OFF, upon which the control signal V4 is provided from the control circuit 11 so as to turn the switching element S4 ON as shown in the waveform (d). Whereby, whenever the energy still remains in the resonance circuit, the current is made to flow through a path of the inductor L1, parasitic diode of the switching element S1, DC power source E, parasitic diode of the switching element S4 and parallel connected capacitor C2 and discharge lamp Z. After the time when the current in the resonance circuit is made zero, the switching elements S1 and S4 are both turned ON in positive direction, and a load current is made to flow in a direction reverse to that in before, through a path of the DC power source E, switching element S1, inductor L1, parallel connection of the capacitor C2 and discharge lamp Z, and switching element S4. Here, when the current in the resonance circuit is made zero and the control signal V4 of the control circuit 11 is made to be at the high level, the switching element S4 turns ON in positive direction, simultaneously. Since in this case the switching element S1 has already turned ON at this time t3, the load current flows through the path of the source E, switching element S1, inductor L1, parallel connection of the capacitor C2 and discharge lamp Z, and switching element S4.

As the time t4 is reached, the supply of the load current through the foregoing path is ceased. At the same time, the control signal V2 for turning the switching element S2 ON is applied, and a current is made to flow, by the energy accumulated in the resonance circuit, through a path of the inductor L1, parallel connection of the capacitor C2 and load Z, switching element S4 and parasitic diode of the switching element S2. Further, as the time t5 is reached, the switching element S4 turns OFF, and such high level control signal V3 of the control circuit 11 as shown by the waveform (c) is provided. So long as the energy remains in the resonance circuit at this time, there flows a current through a path of the inductor L1, parallel connection of the capacitor C2 and discahrge lamp Z, parasitic diode of the switching element S3, power source E, and parasitic diode of the switching element S2. When the energy of the resonance circuit becomes zero, then the load current is supplied through the path of the power source E, switching element S3, parallel connection of the capacitor C2 and discharge lamp Z, inductor L1 and switching element S2.

A series of foregoing actions are repeated, and the DC voltage from the DC power source E is converted into the AC voltage to be applied to the load circuit. In the working aspect as has been described with reference to FIG. 3, the ON time of the diagonally opposing pairs of the switching elements S1, S4 and S2, S3 is made shorter than that in the aspect referred to with reference to FIG. 2, and the power supplied to the load circuit can be reduced. Here, the switching frequency should preferably be set to be in a higher range than the resonance frequency and to be close at least to the lowest value within this range.

Referring more specifically to the above, it is made possible to vary the power supplied to the load circuit for the discharge lamp, by varying the ON/OFF phase of the switching elements S3 and S4 with respect to the ON/OFF timing of the switching elements S1 and S2, that is, with the ON/OFF operation varied between one series circuit of the switching elements S1 and S2 and the other series circuit of the switching elements S3 and S4, but with the switching frequency of these switching elements S1 to S4 kept unchanged. Accordingly, it is enabled to more easily design in particular the filter (not shown) and its environment elements. Since the switching frequency is not varied, further, it is made possible to prevent any influence on such other equipments as the infrared remote controllers and the like. Since the output frequency is also kept unchanged even when the HID lamp is used as the discharge lamp, it is also made possible to reduce any risk of causing the acoustic resonance phenomenon to easily occur when the frequency is varied.

While in the foregoing working aspects the reference has been made to that the switching phase of the switching elements S2 and S3 is caused to delay with respect to the switching phase of the switching elements S1 and S4, it is also possible to attain substantially the same function as in the above even when the switching phase of the switching elements S2 and S3 is advanced to the contrary.

Figure 4:
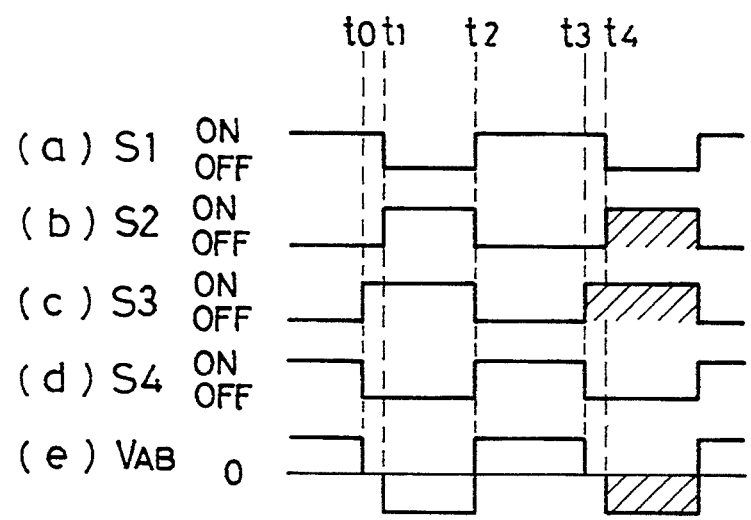

According to a remarkable feature of the present invention, there can be provided an arrangement for preventing the discharge lamp being lighted from failing even when the supplied power to the discharge lamp is limited considerably to be small under low temperature conditions, and for sufficiently enlarging the dimming range of the discharge lamp. Referring to this with reference to FIG. 4, the switching elements S1 and S2 are made mutually different in the ratio of their ON period, that is, in the ON duty. Further, the switching elements S1 and S2 are provided for mutually opposite ON/OFF operation, while the remaining switching elements S3 and S4 are made to be mutually identical in the ratio of the ON period.

In the present instance, the switching elements S1 and S4 are made to be commonly ON in the period prior to the time t0, so that a load current is made to flow through a path of the DC power source E, switching elements S1, inductor L1, parallel connection of the capacitor C2 and discharge lamp Z, and switching element S4. As the time t0 is reached, the switching element S4 is turned OFF, and the load current in the above path thereby flows. At this time t0, the high level control signal V3 is provided from the control circuit 11 to the switching element S3, and the energy accumulated in the resonance circuit is thereby caused to be discharged to form a current path through the inductor L1, parallel connection of the capacitor C2 and discharge lamp Z, and respective parasitic diodes of the switching elements S3 and S1. At the next time t1, the switching element S1 is turned OFF to have the above current path ceased, the high level control signal V2 is provided from the control circuit 11 to the switching element S2 at the same time when the switching element is turned OFF, and another current path is formed by the energy accumulated in the resonance circuit through the inductor L1, parallel connection of the capacitor C2 and discharge lamp Z, parasitic diode of the switching element S3, DC power source E and parasitic diode of the switching element S2. At the time when the current in the resonance circuit has become zero, the load current flows through the path of the DC power source E, switching element S3, parallel connection of the capacitor C2 and discharge lamp Z, inductor L1 and switching element S2.

As the time t2 is reached, both switching elements S2 and S3 are turned OFF, and the supply of the load current through the above path is ceased. At the same time, the control signals V1 and V4 are provided from the control circuit 11 to the switching elements S1 and S4 to turn them ON, and the energy accumulated in the resonance circuit then forms a current path through the parasitic diode of the switching element S1, power source E, parasitic diode of the switching element S4 and parallel connection of the capacitor C2 and discharge lamp Z. At the time when the current from the resonance circuit becomes zero, the load current flows through a path of the power source E, switching element S1, inductor L1, parallel connection of the capacitor C2 and discharge lamp Z, and switching element S4.

As the time t3 is reached, the switching element S4 turns OFF, the load current through the above path is stopped, and, at this moment, the energy in the resonance circuit is discharged through the parasitic diode of the switching element S3 in the same manner as that at the time t0.

In the above working aspect described with reference to FIG. 4, the switching elements S1 and S2 are made mutually different in the ratio of the ON period, so that a period for which the switching elements S1 and S4 are simultaneously ON will be set longer than a period for which the switching elements S2 and S3 are simultaneously ON, the period for which the load current flows will be made thereby different between the simultaneous ON period of the switching elements S1 and S4 and the similar period of the switching elements S2 and S3, and there occurs a difference in the energy accumulated in the resonance circuit in these ON periods. In the event where the ON period of the switching element S2 is made shorter than that of the switching element S1 as in the present aspect, the energy accumulated in the resonance circuit in the simultaneous ON period of the switching elements S1 and S2 is increased, and a DC component which the energy accompanies is to be applied to the load circuit.

In another working aspect of FIG. 5, the ON period of the switching element S2 is made shorter than that of the switching element S1, and the simultaneous ON period of the switching elements S1 and S4 or S2 and S3 is varied by providing a lag in the switching phase of the switching elements S3 and S4 with respect to the switching phase of the switching elements S1 and S2 in the arrangement described with reference to FIG. 4, so that the power supplied to the load circuit is varied to have the supplied power to the discharge lamp Z reduced. In this case, the device can be operated in the same manner as in the case of FIG. 4, except for that the simultaneous ON period of the switching elements S1 and S4 or S2 and S3 is made further shorter than in the case of FIG. 4.

Figure 5:
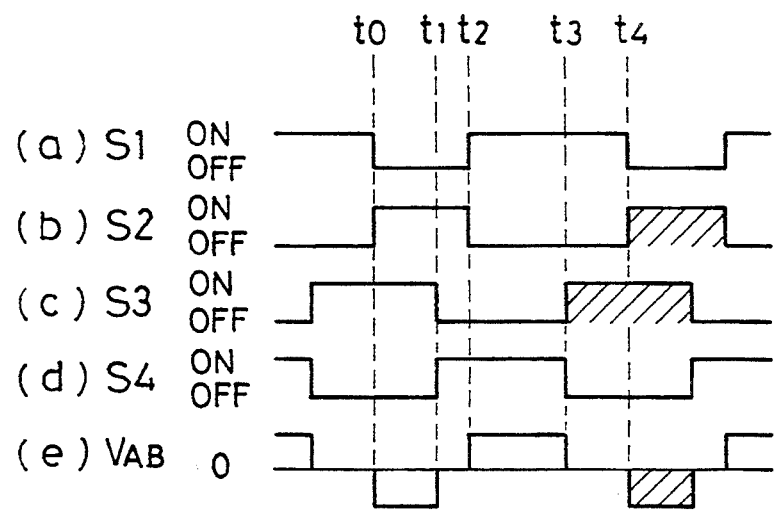

While in the aspect of FIG. 4 the ON/OFF phase of the switching elements S3 and S4 is delayed with respect to the ON/OFF phase of the switching elements S1 and S2, the working aspect of FIG. 5 is to advance the ON/OFF phase of the switching elements S3 and S4 with respect to the ON/OFF phase of the switching elements S1 and S2. Also in this case, the power supplied to the discharge lamp Z can be effectively reduced. With such arrangement, the object can be established without varying the switching frequency, and any problem which the variation of the switching frequency accompanies can be avoided. Further, the simultaneous ON period made different in the length between the switching elements S1 and S4 and the switching elements S2 and S3 is effective to enable the DC component to be effectively applied to the discharge lamp Z. Accordingly, in the event where the dimming state of the discharge lamp Z as the load is made deeper under the low temperature conditions, the foregoing DC component being applied is effective to maintain the lighting of the discharge lamp with this DC component, even upon dropping of the AC component, whereby any failure of the lighting of the discharge lamp Z can be prevented, and the flikering due to a so-called migration can be reduced. Consequently, it is made easier to expand the dimming range of the discharge lamp, and a stable lighting of the discharge lamp can be realized.

Figure 6:
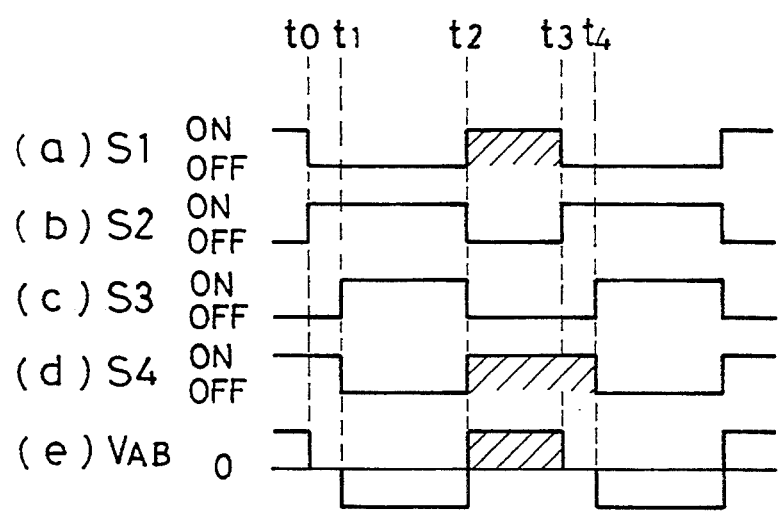

In another working aspect shown in FIG. 6, contrarily to the foregoing aspect of FIG. 4, the ON period of the switching element S1 is made shorter than the ON period of the switching element S2, and the ON/OFF phase of the switching elements S3 and S4 is delayed with respect to the ON/OFF phase of the switching elements S1 and S2. In this case, as seen in FIG. 6, the simultaneous ON period of the switching elements S2 and S3 is made longer than the simultaneous ON period of the switching elements S1 and S4, whereby a DC component of a polarily reverse to that in the foregoing aspect is to be accumulated in the inductor L1, which component is also effective to restrain any failure of the discharge lamp Z.

Figure 7:
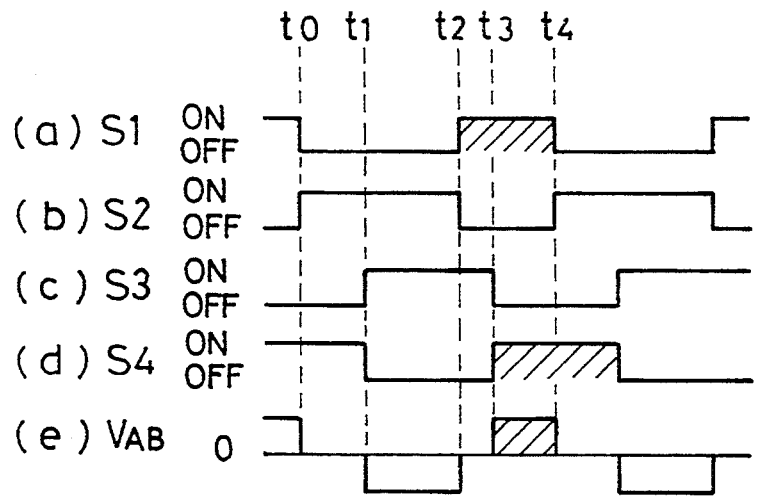
Figure 8:
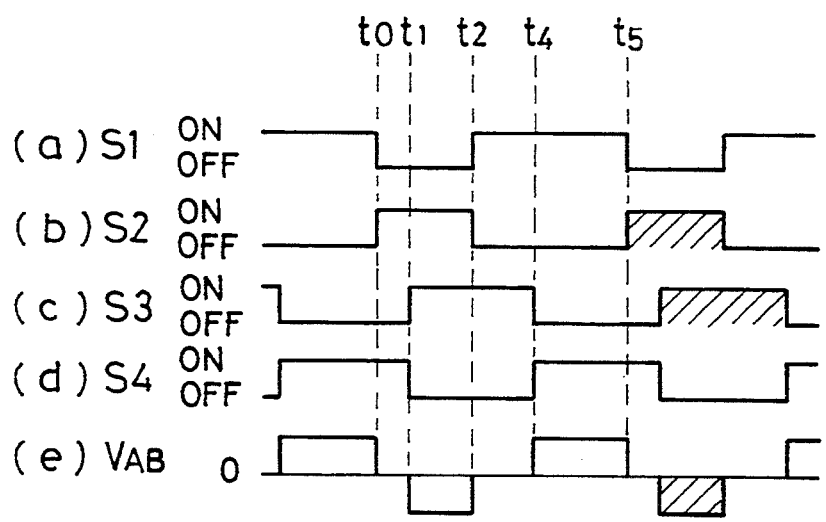
Figure 9:
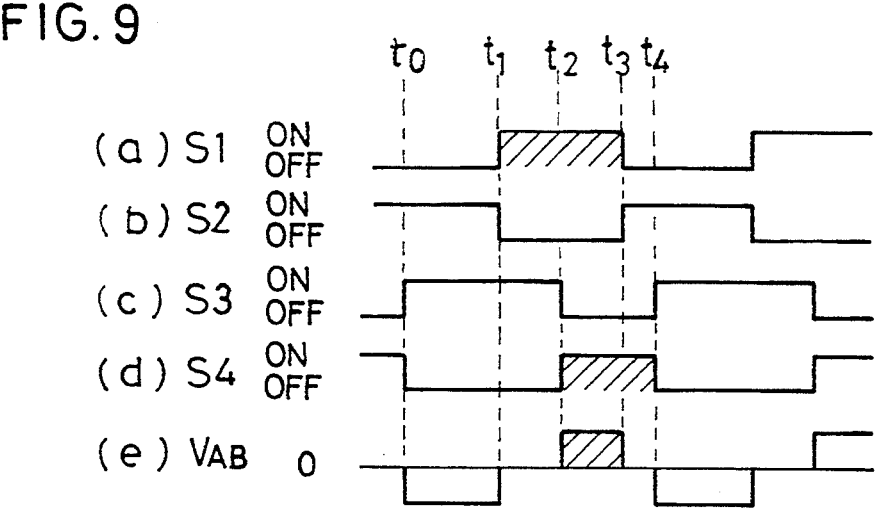

In a working aspect of FIG. 7, the ON/OFF phase of the switching elements S3 and S4 is further delayed than in the case of FIG. 6, with respect to the ON/OFF phase of the switching elements S1 and S2, so that the power supplied to the discharge lamp Z can be further reduced. In FIG. 8, there is shown another working aspect in which the ON period of the switching elements S1 is made longer than the ON period of the switching element S2, and the ON/OFF phase of the switching elements S3 and S4 is delayed with respect to the ON/OFF phase of the switching elements S1 and S2. With this working aspect of FIG, 8, too, it is possible to restrain the lighting failure of the discharge lamp Z, and to reduce the supplied power to the discharge lamp Z. Further, it is also possible to attain the same operation as in the foregoing aspects even when, as in a further working aspect shown in FIG. 9, the ratio of the ON period is varied between the switching elements S3 and S4.

While in the foregoing aspects the application of the DC component to the discharge lamp Z is attained by rendering the energy accumulating state in the resonance circuit to be unbalance, the DC component applied in practice to the discharge lamp Z is kept substantially constant. Here, the state in which the failure of the discharge lamp Z is apt to occur is the state in which the dimming is deeply carried out, and it is desirable that, when the supplied power to the discharge lamp Z is lowered, the DC component applied to the discharge lamp Z is rather increased. Here, an aspect in which the supplied power to the discharge lamp Z is lowered or reduced is an event where the ON/OFF phase lag of the switching elements S3 and S4 is made larger with respect to that of the switching elements S1 and S2. In this event, the arrangement is so made that, as the ON/OFF phase lag of the switching elements S3 and S4 is made larger with respect to that of the switching elements S1 and S2, the ratio of the ON period of the switching elements S3 and S4 is varied to a large extent, and the DC voltage applied to the discharge lamp Z can be effectively increased as the supplied power to the discharge lamp Z decreases.

Figure 10:
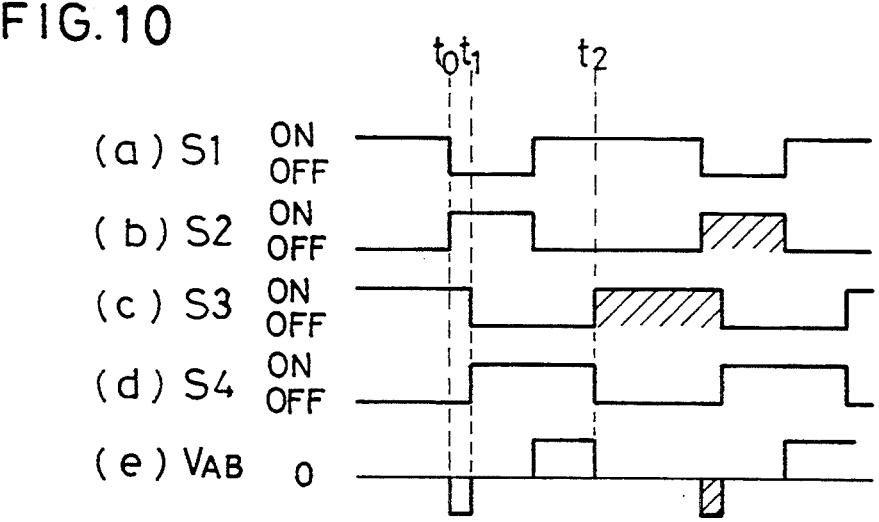

More specifically, as shown in, for example, FIGS. 4 and 5 or additionally in FIG. 10, the variation of the ON/OFF phase lag of the switching elements S3 and S4 is made larger with respect to the ON/OFF phase of the switching elements S1 and S2 to have the ON period ratio between the switching elements S1 and S2 varied to a large extent, and then the foregoing function can be well attained. That is, with respect to the state shown in FIG. 3, for example, the working aspect of FIG. 5 is capable of reducing the supplied voltage to the discharge lamp Z and, with the aspect of FIG. 10, the supplied power to the discharge lamp Z can be further reduced. Consequently, the ON period ratio between the switching elements S1 and S2 is remarkably varied so that, as will be readily appreciated, the extent of unbalance in the accumulated state of energy in the resonance circuit increases, and eventually the DC component applied to the discharge lamp Z is increased.

Figure 11:
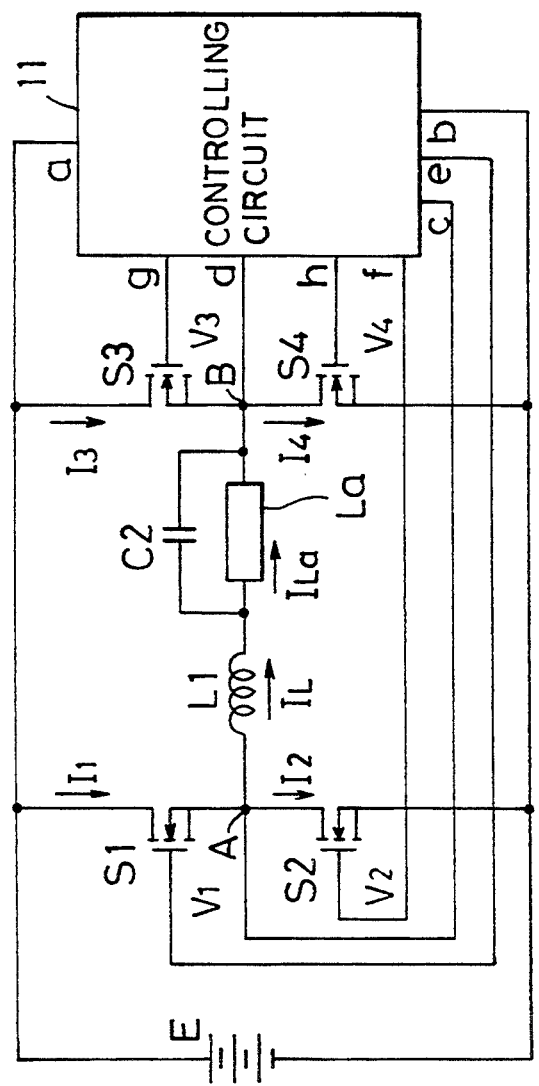
FIG. 11 is a circuit diagram of another embodiment of the present invention.

Referring now to FIG. 11, there is shown a more practical embodiment of the device according to the present invention. In the present instance, as will be clear when respective waveform diagrams of FIGS. 12 and 13 at respective parts of the particular embodiment, the arrangement is so made that the ON period ratio between the switching elements S1 and S2 is varied, and that the ON/OFF phase of the switching elements S3 and S4 is advanced with respect to the ON/OFF phase of the switching elements S1 and S2. Here, it will be appreciated from FIG. 13 that the supplied power to the discharge lamp Z can be attempted to be reduced, and the same function as that in the foregoing embodiments can be realized.

Figure 12:
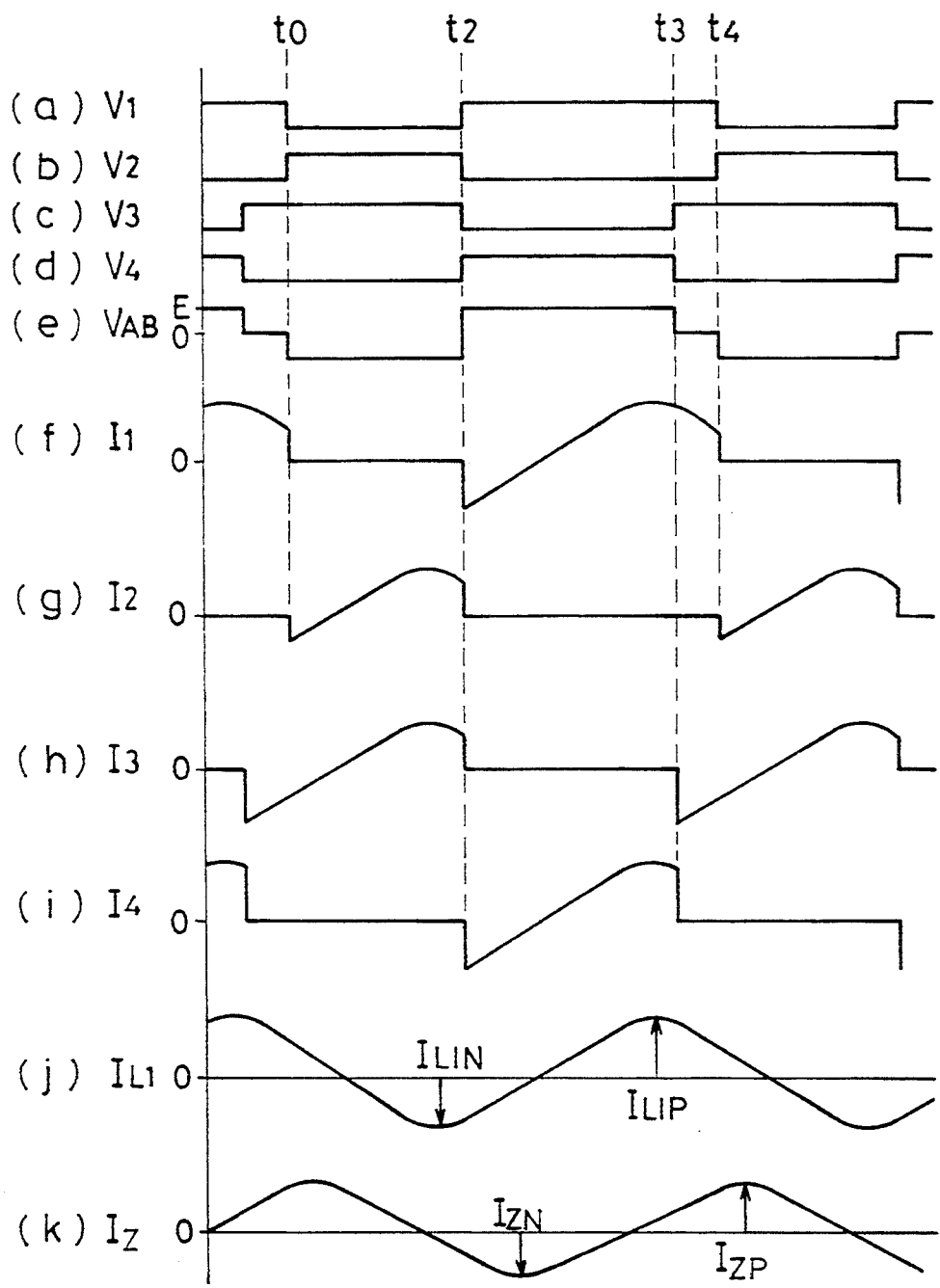
FIGS. 12 and 13 are explanatory waveform diagrams for the operation of the embodiment shown in FIG. 11.
Figure 13:
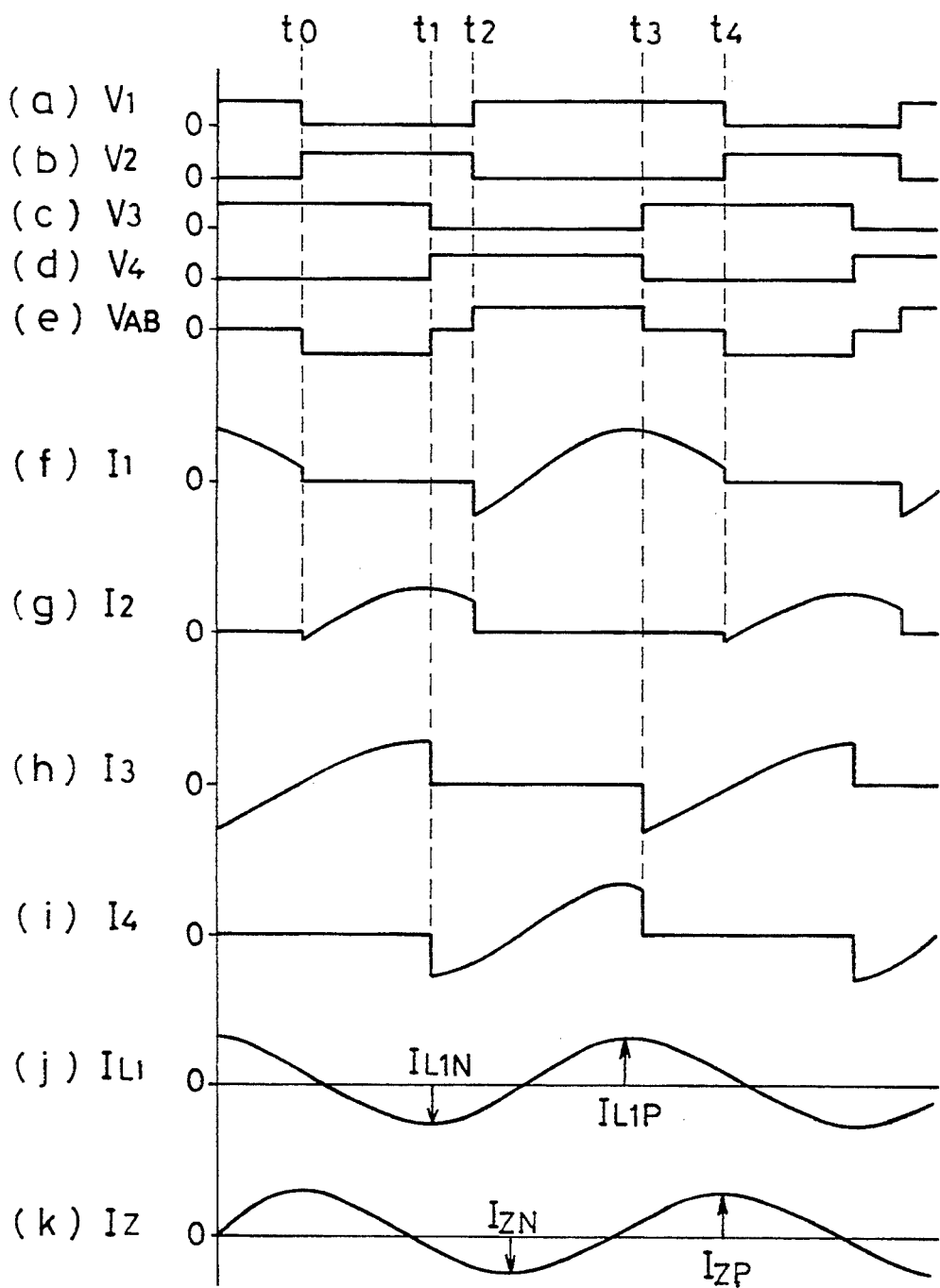

In the discharge lamp lighting device shown in FIG. 11, on the other hand, the current $I_{L1}$ flowing through the inductor L1 is made to be higher in the positive peak value $I_{L1P}$ than the negative peak value $I_{L1N}$ by varying the ON period ratio between the switching elements S1 and S2, as will be clear from FIGS. 12 and 13, whereby the lamp current $I_Z$ is made to be also higher in the positive peak value $I_{ZP}$ than the negative peak value $I_{ZN}$ as will be seen also in FIGS. 12 and 13, and the power supplied to the discharge lamp Z can be reduced by employing an arrangement for superposing the DC component on the lamp current $I_Z$.

Figure 14A:
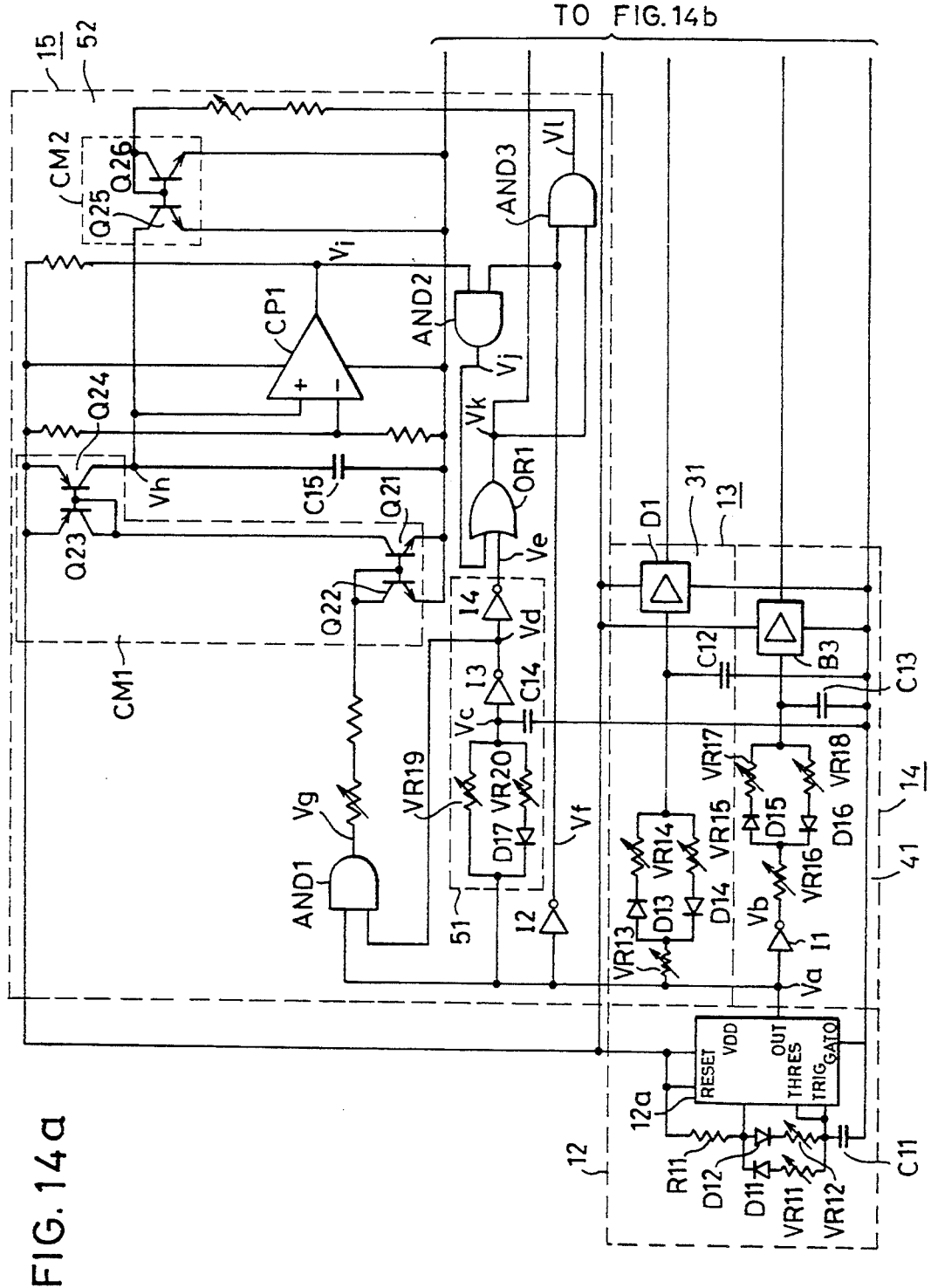
FIG. 14 is a detailed circuit diagram of a control circuit in the embodiment of FIG. 11.
Figure 14:
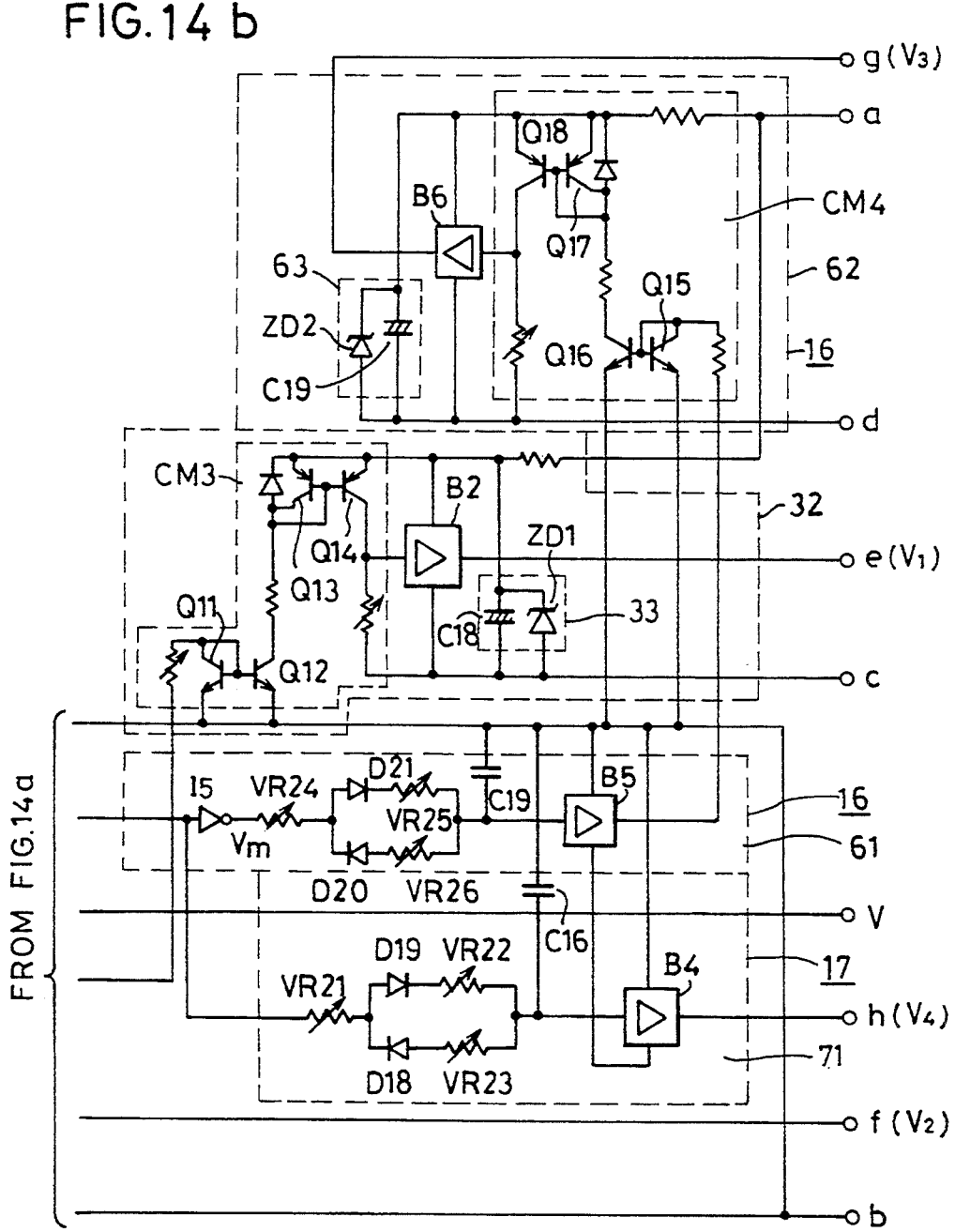
Figure 14:
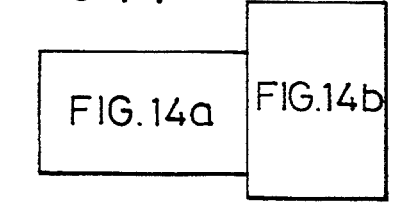

In FIG. 14, there is shown a detailed circuit diagram of the control circuit 11 in the discharge lamp lighting device of FIG. 11, which comprises an oscillation circuit 12 generating square-wave signals of a fundamental frequency, driving circuits 13 and 14 for driving the switching elements S1 and S2 in accordance with the signals of the oscillation circuit 12, a delay circuit 15 which prepares signals delayed for a fixed period with respect to the outputs of the oscillation circuit 12, and driving circuits 16 and 17 for driving the switching elements S3 and S4 in accordance with the signals from the delay circuit 15. The oscillation circuit 12 consists of a timer IC12a and such elements externally mounted to the timer IC12a as a resistor R11, variable resistors VR11 and VR12, diodes D11 and D12 and a capacitor C11, and generates such square-wave signals as shown by a waveform (a) in FIG. 15. Here, a regulation of the variable resistors VR11 and VR12 allows the ratio between high level and low level periods of the square signals to be variable.

The driving circuit 13 for the switching element S1 is constituted of a dead-OFF circuit 31 for setting a period with respect to the output signals of the oscillation circuit 12 so as to prevent any short-circuit from occurring between the switching element S1 and the DC power source E due to simultaneous turning-ON with the other switching element S2, and a .level shift circuit 32. While references have not been made in the foregoing working aspects, the simultaneous turning ON of the switching elements S1 and S2 or S3 and S4 connected in series to the DC power source E causes the short-circuit to be apt to occur with respect to the source E. In order to prevent this, there is provided the dead-OFF period in which the switching elements S1 and S2 or S3 and S4 are made concurrently OFF at the moment of the turning ON and OFF of the switching elements S1 and S2 or S3 and S4. The dead-OFF circuit 31 consists of three variable resistors VR13 to VR15, two diodes D13 and D14, a capacitor C12 and a buffer amplifier B1. That is, such signals V1 of a waveform (c) in FIG. 15 and delayed at the rise of the output signals Va of the oscillation circuit 12 by a time interval determined by a time constant of the variable resistors VR13 and VR14 and capacitor C12 (a period from t0 to t1 in FIG. 15) are prepared.

The level shift circuit 32 consists of a current-mirror circuit CM3 comprising transistors Q11 to Q14, a buffer amplifier B2, and a constant voltage circuit 33 comprising a Zener diode ZD1 and a capacitor C18 for rendering the voltage of the DC power source E to be a constant voltage. At this level shift circuit 32, the outputs of the dead-OFF circuit 31 are replaced by a current at the current-mirror circuit CM3 to transmit signals to the buffer amplifier B2 which actuates at a different potential, and outputs of this buffer amplifier B2 are provided to the switching element S1 as the control signals V1. The driving circuit 14 for the switching element S2 includes a dead-OFF circuit 41 for setting the dead-OFF period for preventing the short-circuit between the DC power source E and the switching element S2 due to the simultaneous ON with the switching element S1, with respect to the output Va of the oscillation circuit 12. In this case, it is possible to render an operating reference potential of the switching element S2 to coincide with the reference potential of the control circuit 11, and to render the level-shift circuit 42 to be unnecessary. The dead-OFF circuit 41 comprises an inverter gate I1, variable resistors VR16 to VR18, diodes D15 and D16, capacitor C13 and buffer amplifier B3. At this dead-OFF circuit 41, the outputs Va of the oscillation circuit 12 are inverted, as shown by a waveform (b) of FIG. 15, and signals of a delayed rise from the rise of the outputs Va of the oscillation circuit 12, as shown by a waveform (d) of FIG. 15, as delayed by a period determined by a time constant of the variable resistors VR16 and VR17 and capacitor C13, which period being a term t4–t5 in FIG. 15.

The delay circuit 15 generally comprises a delay-period setting circuit 51 for setting the delay period of the output Va of the oscillation circuit 12, and a delayed-signal preparing circuit 52 for preparing the delayed signals with the output Va of the oscillation circuit 12 delayed as a whole in accordance with the delay period set by the delay-period setting circuit 51. More specifically, the delay-period setting circuit 51 comprises variable resistors VR19 and VR20, diode D17, capacitor C14 and inverter gates I3 and I4, and the period determined by the time constant of the variable resistor VR19 and capacitor C14, for example, a period t0–t2, will be the delay period for the output Va of the oscillation circuit 12. In more detail, the capacitor C14 starts being charged from the rise of the output Va of the oscillation circuit 12 as shown by a waveform (e) of FIG. 15 and, as a voltage across the capacitor C14 meets a threshold voltage of the inverter gate I3, an output Vd of the inverter gate I3 will be as shown by a waveform (f) of FIG. 15.

The delayed-signal preparing circuit 52 comprises an AND gate AND1 taking an AND of the output Vd of the inverter gate I3 and the output Va of the oscillation circuit 12, a delaying capacitor C15, a current-mirror circuit CM1 for charging the capacitor C15 with an output Vg of the AND gate AND1, a comparator CP1 for comparing the voltage across the capacitor C15 with a predetermined voltage, an inverter gate I2 for inverting the output Va of the oscillation circuit 12, an AND gate AND2 taking an AND of an output Vf of the inverter gate I2 and an output Vi of the comparator CP1, an OR gate OR1 taking an OR of an output Vj of the AND gate AND2 and an output Ve of the delay-period setting circuit 51, and a current-mirror circuit CM2 for discharging the capacitor C15 in accordance with an output Vl of an AND gate AND3 taking an AND of an output Vk of the OR gate OR1 and the output Vf of the inverter gate I2.

Figure 15:
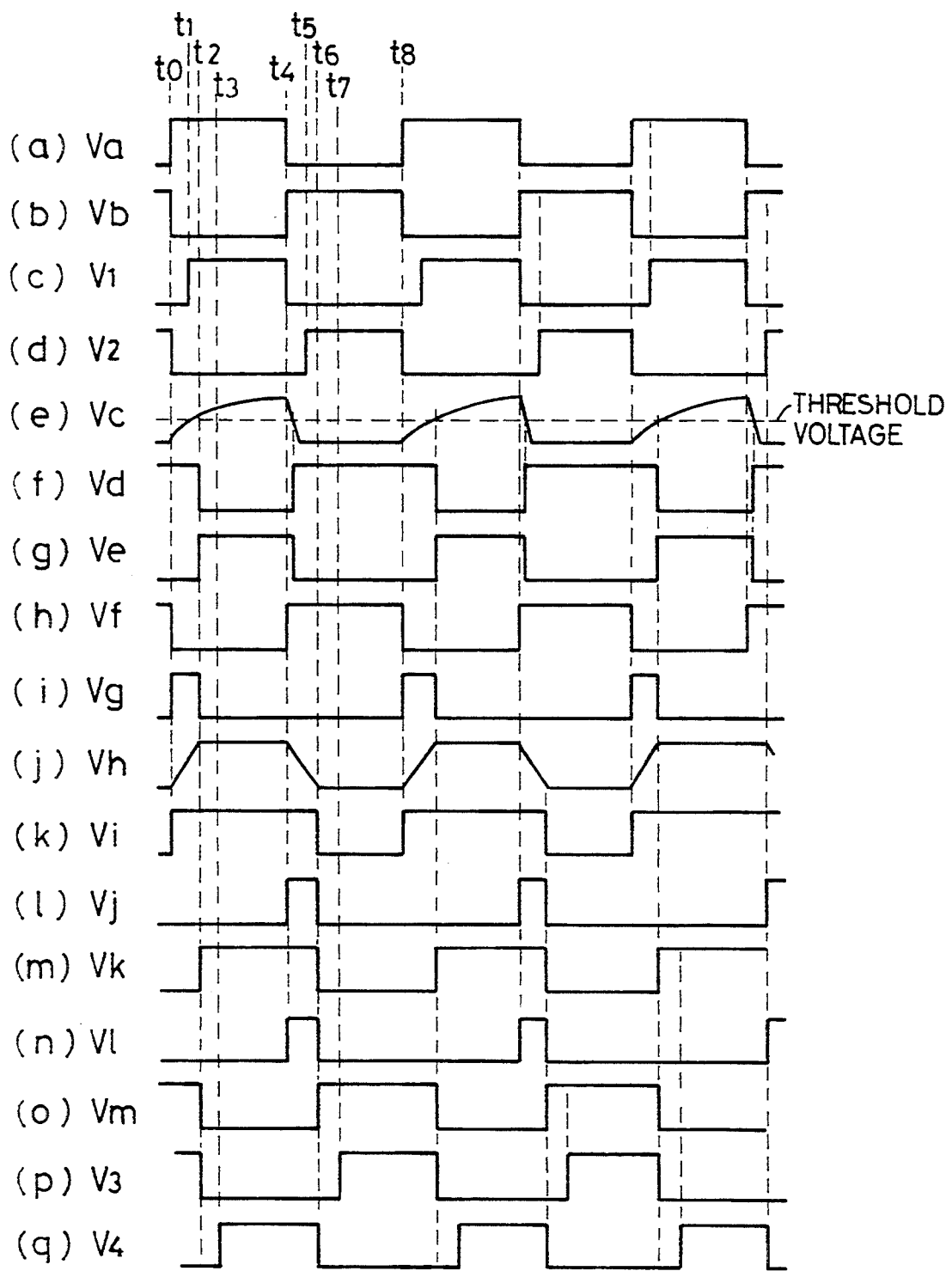
FIG. 15 is an explanatory waveform diagram for the operation of the control circuit in FIG. 14.

In the delayed-signal preparing circuit 52, in this case, the output Vg of the AND gate AND1 at the time when the AND is taken between such output Vd of the inverter gate I3 of the delay-period setting circuit 51 as shown by the waveform (f) of FIG. 15 and the output Va of the oscillation circuit 12 will be at a high level for a period corresponding to the delay period set at the delay-period setting circuit 51 as shown by a waveform (i) in FIG. 15, and the capacitor C15 is charged by the current-mirror circuit CM1 as shown by a waveform (j) in FIG. 15 in this period for which the output Vg of the AND gate AND1 is at the high level. At this time, the predetermined voltage set as a reference voltage in the comparator CP1 is set to be substantially zero volt, and the comparator output Vi will be maintained at the high level as shown by a waveform (k) in FIG. 15.

At the above referred point of the operation, the output Vf of the inverter gate I2 is at a low level as shown in a waveform (h) in FIG. 15, and the output Vj of the AND gate AND2 will be at the low level as seen in a waveform (1) of FIG. 15, while the output Vi of the comparator CP1 is kept at the high level for the period in which the capacitor C15 is being charged. Here, as the output Va of the oscillation circuit 12 shifts to the low level as seen in the waveform (a) of FIG. 15, the output Vf of the inverter gate I2 rises to the high level as seen in the waveform (h), due to which the output Vj of the AND gate AND2 shifts to the high level as seen in the waveform (l) of FIG. 15, and the output Vk of the OR gate OR1 is thereby kept at the high level as shown in a waveform (m) of FIG. 15 even after the fall to the low level of the output Ve of the inverter gate I4 of the delay-period setting circuit 51. At this time, the output Vl of the AND gate AND3 rises to the high level as seen in a waveform (n) of FIG. 15, so that the current-mirror circuit CM2 is actuated, and the capacitor C15 starts discharging. This current-mirror circuit CM2 and the foregoing current-mirror circuit CM1 are set to have a mirror ratio of 1:1, and the capacitor C15 is completely discharged after the same period as that set by the delay-period setting circuit 51, as shown in the waveform (j) of FIG. 15.

As the capacitor C15 is completely discharged, the output Vi of the converter CP1 falls to the low level as shown in the waveform (k) of FIG. 15, whereby the output Vj of the AND gate AND2 is made to be at the low level as seen in the waveform (l) of FIG. 15, and the output Vk of the OR gate OR1 also falls to be low level as seen in the waveform (m) of FIG. 15. With this output Vk of the OR gate OR1, the output Vl of the AND gate AND3 falls to the low level as in the waveform (n) of FIG. 15, and the operation of the current-mirror circuit CM2 is stopped. That is, the delayed-signal preparing circuit 52 is so provided that the fall of the output Vk of the OR gate OR1 will be delayed by the same period as that set by the delay-period setting circuit 51, and the signals are prepared with the output Va of the oscillation circuit 12 delayed as a whole in accordance with the set delay period of the delay-period setting circuit 51. Further, as based on such output Vk, the driving circuits 16 and 17 are operated to drive the switching elements S3 and S4. The driving circuit 16 for the switching element S3 comprises a dead-OFF circuit 61 and a level shift circuit 62, while the driving circuit 17 for the switching element S4 consists of a dead-OFF circuit 71. The dead-OFF circuit 61 is constituted by an inverter gate I5, variable resistors VR24–VR26, diodes D20 and D21, capacitor C17 and buffer amplifier B5, and sets a dead-OFF period by causing the rise of the inverted output Vm of the output of the OR gate OR1 to be delayed by a period shown by t6–t7 in FIG. 15. Further, the level shift circuit 62 comprises a current-mirror circuit CM4 formed by transistors Q15–Q18, a buffer amplifier B6, and a constant voltage circuit 63 consisting of a Zener diode ZD2 and a capacitor C19 for rendering the voltage of the DC power source E to be constant.

The dead-OFF circuit 71 comprises variable resistors VR21–VR23, diodes D18 and D19, a capacitor C16 and a buffer amplifier B4, and sets the dead-OFF period by causing the rise of an inverted output of the output Vk of the OR gate OR1 to be delayed by a period shown by t2–t3 in FIG. 15, whereby a time difference between t1 and t3 in FIG. 15 is given as a phase difference between ON/OFF timing of the switching elements S1 and S2 or S3 and S4. In rendering the ON period ratio of the switching elements S1 and S2 to be variable, it will suffice the purpose to enlarge the resistance value of the variable resistor VR15 in FIG. 16, for example, so as to have the falling timing of the control signal V1 delayed.

Figure 16:
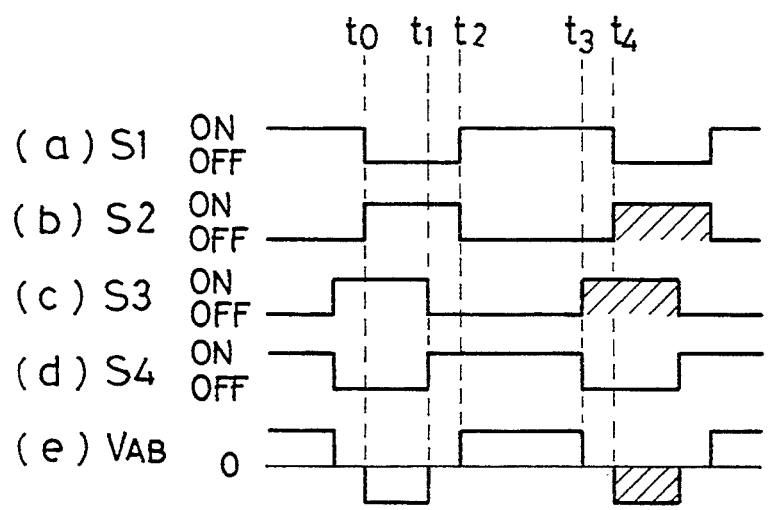
FIGS. 16 to 18 show in waveform diagrams other working aspects of the device according to the present invention.

Referring to FIG. 16, there is shown another working aspect in which the circuit of FIG. 11 is employed. In the foregoing working aspects, the DC component is applied to the load circuit with the ON period ratio between the switching elements S1 and S2. When at this time the ON period ratio of these switching elements S1 and S2 is varied, there may arise a problem that the power supplied to the discharge lamp Z is reduced even in the case when the supplied power to the discharge lamp is large, that is, even in an event where the lamp is in its fully lighted state. In the present aspect, on the other hand, the arrangement is so made that the ON period ratio of the other switching elements S3 and S4 is also varied, as the ratio of the switching elements S1 and S2 is varied. In the case when, for example, the ON period of the switching element S1 is made longer than the ON period of the switching element S2 as shown in waveforms (a) and (b) in FIG. 16, then the ON period of the switching element S4 is also set to be longer than the ON period of the switching element S3 as shown in waveforms (c) and (d), so that it is made possible to prolong the simultaneous ON period of the switching elements S1 and S4 so as to increase the supplied power to the discharge lamp Z as a whole of the discharge lamp lighting device, and to thus supply to the discharge lamp Z the power substantially of the same extent as that in the aspect where the ON period ratio between the switching elements S1 and S2 is not varied.

Figure 17:
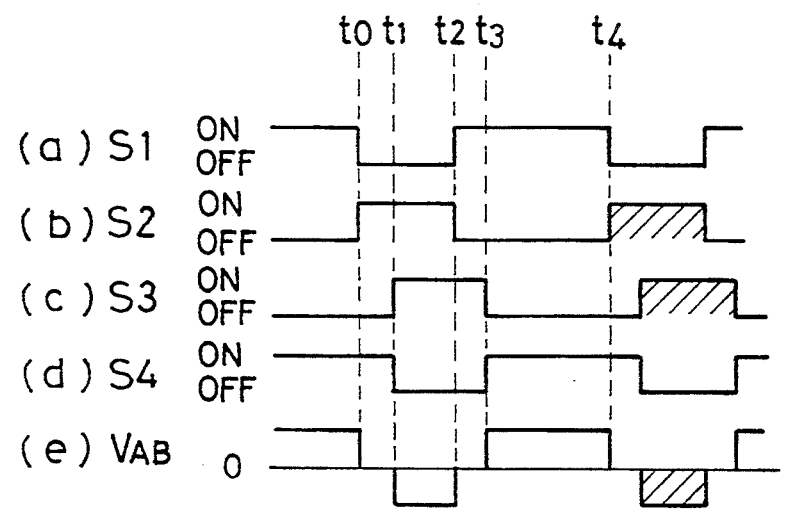

Shown in FIG. 17 is another working aspect in which the ON/OFF timing of the switching elements S3 and S4 is delayed with respect to the ON/OFF timing of the switching elements S1 and S2. When also in this case the ON period of the switching element S1 is made longer than that of the switching element S2 as seen in waveforms (a) and (b) of FIG. 17, the ON period of the switching element S4 is so set as to be longer than that of the switching element S3 as shown by waveforms (c) and (d) of FIG. 17, according to which it is enabled to prolong the simultaneous ON period of the switching elements S1 and S4 for increasing the supplied power to the discharge lamp Z as a whole of the discharge lamp lighting device.

Figure 18:
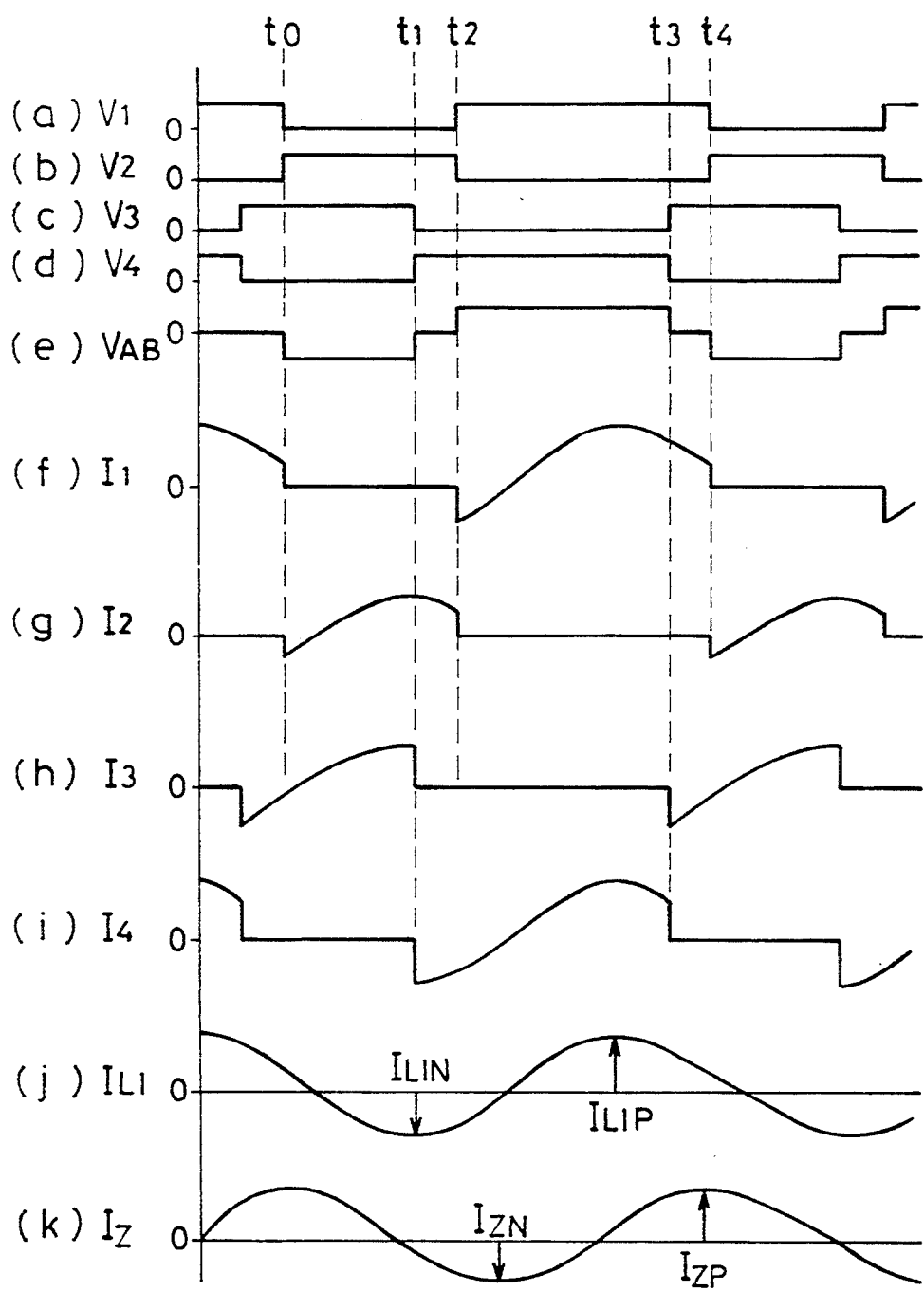

In FIG. 18, another working aspect employing the circuit of FIG. 11 is shown, in which the arrangement is so made that, when the supplied power to the discharge lamp Z shows a tendency of being reduced during the full lighting of the discharge lamp with the ON period ratio between the switching elements S1 and S2 varied in similar manner to the above aspect, it is made possible to complement such reduction by varying the ON period ratio between the switching elements S3 and S4 in accordance with the ON period ratio between the switching elements S1 and S2.

Figure 19:
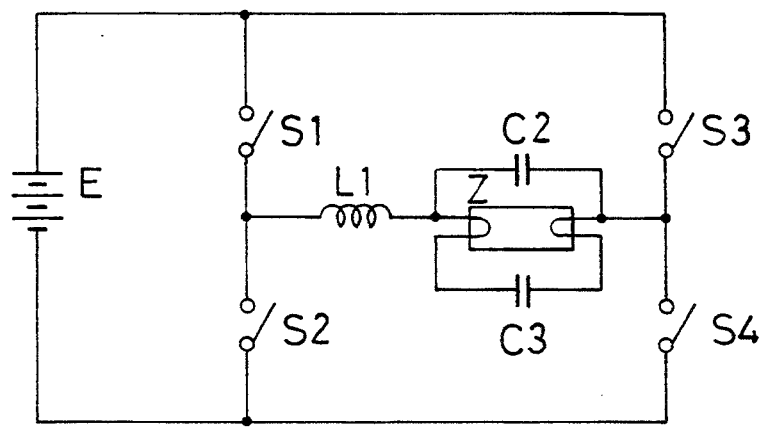
FIGS. 19 and 20 show in circuit diagrams further working aspects of the present invention.

In FIG. 19, there is shown a circuit diagram of another embodiment of the discharge lamp lighting device according to the present invention, in which a preheating capacitor C3 is connected across both ends on non-source side of filaments of the discharge lamp Z, in addition to the resonance capacitor C2 parallel to the discharge lamp Z. In this instance, a current is made to flow through the capacitor C3 to the filaments in non-lighting state of the discharge lamp Z, so as to vary the phase of the switching elements S3 and S4 with respect to the switching elements S1 and S2, and to thereby increase the output. As the voltage across the capacitor C3 falls when the discharge lamp Z is lighted, the current through the capacitor C3 decreases, and the capacitor C3 is thus contributive to the preheating prior to the lighting. This arrangement can be employed in the respective foregoing embodiments so that the discharge lamp Z can be subjected to the dimming lighting without varying the switching frequency of the switching elements S1–S4, while any failure, flicker and the like of the discharge lamp Z can be effectively restrained and prevented from occurring by varying the ON period ratio between the switching elements S1 and S2.

Figure 20:
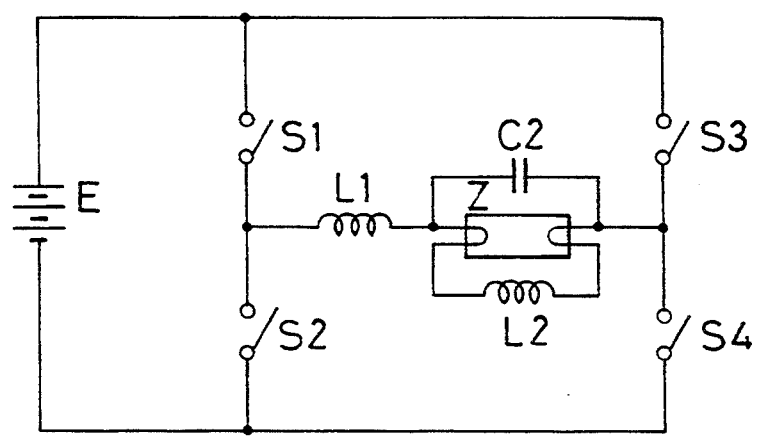

In another embodiment of the present invention as shown in FIG. 20, a second induction L2 is employed for preheating the discharge lamp Z. With this arrangement, too, it is possible to preheat the filaments prior to the lighting of the discharge lamp Z, and additionally to increase the DC component to be superposed onto the supplied power to the discharge lamp Z by causing the accumulated energy in the inductor L2 to be varied by varying the ON period ratio of the switching elements S1 and S2, so that the failure of the discharge lamp Z in the deep or large extent dimming state under the lower temperature conditions can be further excellently prevented.

Figure 21:
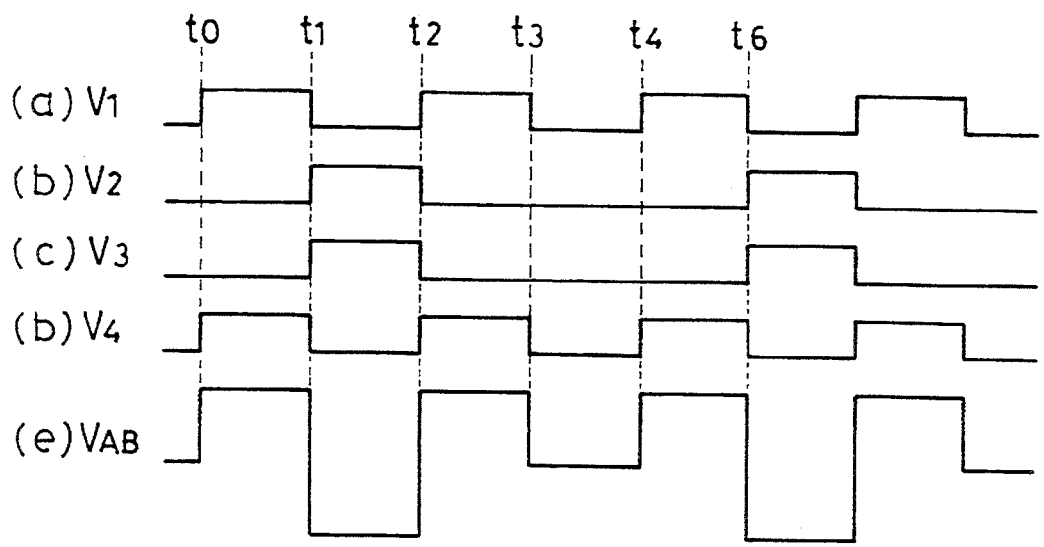
FIGS. 21 and 22 shows another working aspect of the circuit shown in FIG. 11.

In FIG. 21, another working aspect of the invention with the circuit of FIG. 11 employed is shown, in which the switching frequency, i.e., switching cycle of the switching elements S2 and S3 is differentiated from that of the switching elements S1 and S4, and further the switching elements S2 and S3 are synchronized in their OFF timing with the switching elements S1 and S4 and are made ON at a switching cycle twice as large as that of the switching elements S1 and S4. Referring here more specifically to the operation following a timing at which waveforms become different from those in the foregoing aspects, the switching element S3 does not turn ON at the time t3 but an oscillation is caused to occur by the energy accumulated in the oscillation circuit. At the next time t4, the switching elements S1 and S4 turn ON, so that the load current $I_Z$ will flow from the source E through the path of the switching element S1, inductor L1, parallel connection of the capacitor C2 and discharge lamp Z, and switching element S4. That is, the load current $I_Z$ is made to flow in an aspect where the energy accumulated in the resonance circuit is added to the source voltage, and the energy accumulated in the inductor L1 is further increased. At the time t5, the control signals V2 and V3 for turning the switching elements S2 and S3 ON are provided, upon which the energy accumulated in the resonance circuit causes a current to flow through the inductor L1, parallel connection of the capacitor C2 and discharge lamp Z, parasitic diode of the switching element S3, DC power source E, and parasitic diode of the switching element S2 and, after exhaustion of the energy, the switching elements S2 and S3 now turned ON in positive direction cause the load current $I_Z$ to be supplied through a path of the DC power source E, switching element S3, parallel connection of the discharge lamp Z and capacitor C2, inductor L1 and switching element S2. Further, the switching elements S2 and S3 are so arranged as to be turned ON within a period in which they can be turned ON, whereby the positive and negative voltages can be made applicable to the resonance circuit.

Figure 22:
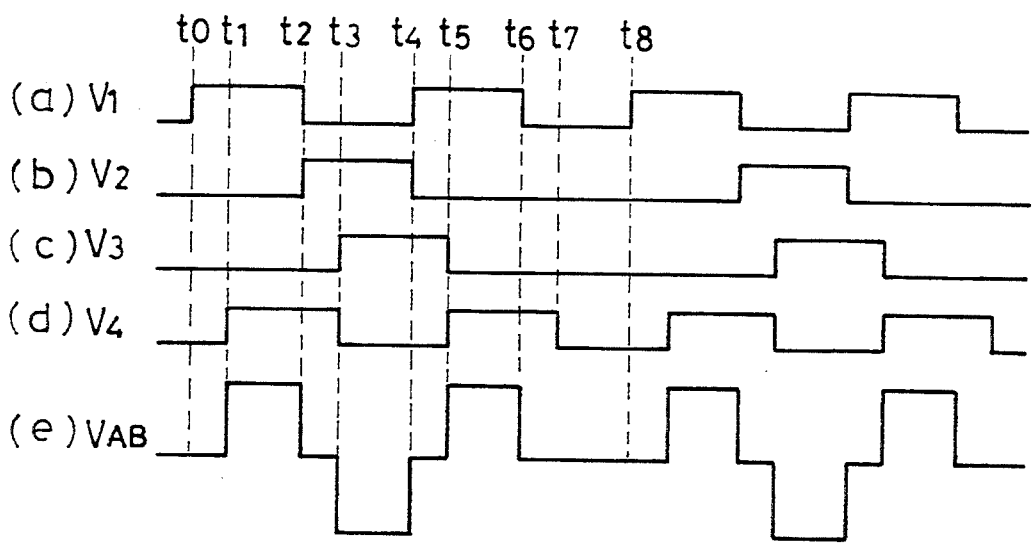

In FIG. 22, there is shown another working aspect of the circuit shown in FIG. 11, in which the arrangement is so made that the switching elements S3 and S4 are varied in the ON/OFF phase with respect to the switching elements S1 and S2, and the simultaneous ON period of the switching elements S1 and S4 or S2 and S3 which are mutually at diagonally opposing positions is shortened, so as to reduce the power supplied to the discharge lamp Z. Therefore, in addition to that the supplied power to the discharge lamp can be varied without varying the switching frequency, it is made possible to render the switching frequency to be different between the diagonally opposing pairs of the switching elements S1, S4 and S2, S3 so that, preferably, the switching elements S1 and S4 will have a higher or lower switching frequency than the switching elements S2 and S3. The positive and negative voltages applied to the resonance circuit are made thereby unbalanced, and the application of the DC voltage to the discharge lamp Z is made effective. Accordingly, the discharge lamp Z can be stably lighted even in the deep dimming state under the low temperature conditions, and any flicker or the like can be prevented. It is further possible to vary the ON/OFF ratio between the pair of the switching elements in the series connection, for example, between the switching elements S3 and S4, so that a time ratio between positive and negative periods of such applied voltage $V_{AB}$ as shown by a waveform (e) of FIG. 22 is made controllable, and it is also made possible to vary DC superposing level.

Further according to the present invention, there can be provided an arrangement in which the discharge lamp Z can be more excellently preheated for the starting in the circuit of FIG. 19. Generally, the discharge lamp being not lighted is extremely high in the impedance so as not to be affected by the resonance action of the resonance circuit, and the resonance frequency becomes the maximum. Here, the switching frequency of the switching elements of the minimum switching frequency among such elements S1 to S4 as shown in the embodiment of FIG. 11, for example, the switching elements S2 and S3 is set to be slightly higher than the resonance frequency of the resonance circuit. Further, the phase of the ON/OFF timing of the diagonally opposing pairs of the switching elements S1, S4 and S2, S3 is varied from the 180 degree lagged state to the in-phase state, with the control signals for the switching elements of the maximum switching frequency among such elements S1–S4 as in the embodiment of FIG. 11 made as the reference. Consequently, the discharge lamp lighting can be attained by varying the simultaneous ON period of the switching elements S1, S4 and S2, S3 from the shorter state to the longer state, preheating the filaments of the lamp while keeping it in non-lit state, and thereafter applying a discharge starting voltage to the lamp. For the preheating and starting of the discharge lamp Z, it is possible to employ an arrangement in which, similarly to the case of discharge lamp lighting devices of the kind referred to normally, the starting and lighting are carried out by first bringing the switching frequency of the device from a high frequency state to a state closer to the resonance frequency of the resonance circuit. When a constant lighting state is reached, the simultaneous ON period between the diagonally opposing pairs of the switching elements S1, S4 and S2, S3 is varied to realize the dimming control.

In other working aspects of the present invention, there is taken a measure for preventing the supplied power to the discharge lamp from fluctuating due to any fluctuation in the source voltage. Accordingly, the discharge lamp lighting device is provided with a power fluctuation preventing circuit with respect to the supplied power to the discharge lamp Z. In practice, in the circuit of FIG. 14, such element as a photocoupler or the like the resistance value of which on secondary terminal side is varied by a primary side current is connected in parallel to the variable resistor VR19, so that a current flowing to an output transistor of the photocoupler is varied in accordance with the fluctuation in the source voltage, the charging current to the capacitor C14 is thereby varied, and the set state of the delay period by the delay-period setting circuit 51 can be varied. Now, as the source voltage rises, the current input to the photocoupler is reduced, the output current of the photocoupler is thereby lowered, and required charging time for the capacitor C14 is prolonged, whereby the simultaneous ON period between the switching elements S1, S4 and S2, S3 is shortened, and the current flowing to the discharge lamp Z can be effectively restrained. When the source voltage falls, to the contrary, a stabilization of the supplied power to the discharge lamp is attempted by means of a feed-forward added by the provision of the foregoing power fluctuation preventing circuit, and a stable lighting of the discharge lamp Z can be effectively realized.

Figure 23:
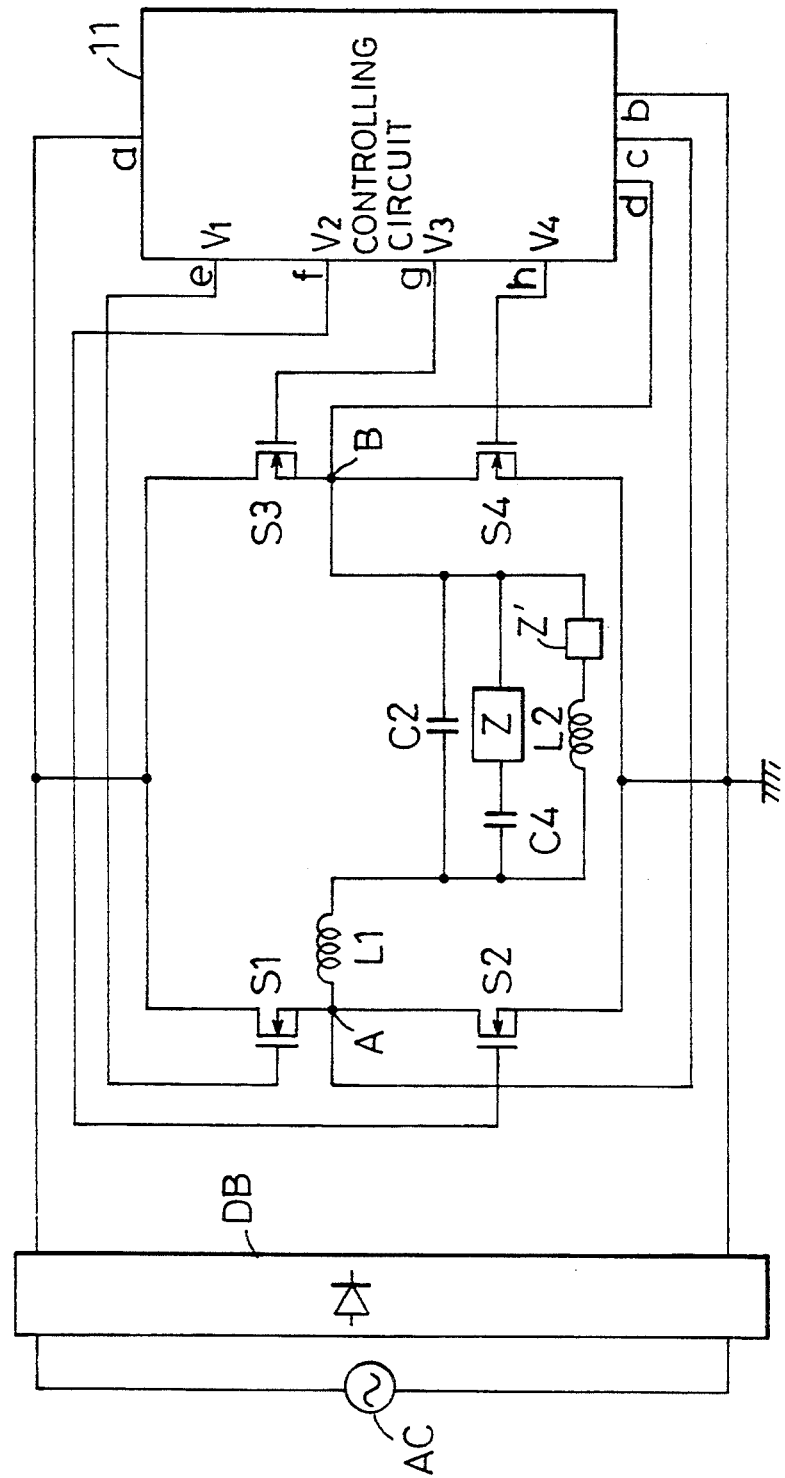
FIGS. 23 and 24 are circuit diagrams showing further embodiments of the device according to the present invention.

While the description has been made with reference to the lighting control of the single discharge lamp in any of the foregoing embodiments of the discharge lamp lighting device, the device can be effectively employed also as the lighting device for a plurality of the discharge lamps. Referring to FIG. 23, there is shown a discharge lamp lighting device arranged for supplying the power from the same device to a pair of the discharge lamps Z and Z'. In this device, a series circuit of a capacitor C4 and a discharge lamp Z and a further series circuit of a further inductor L2 and the other discharge lamp L' are respectively connected across the capacitor C2, so that only AC component resulting from the resonance can be made to flow to the discharge lamp Z while causing a DC component to be made to flow to the other discharge lamp Z'. With the inductor L2 connected across non-source side ends of both filaments of the other discharge lamp Z', it is then made possible to cause a preheating current to flow to the filaments with a DC component generated in the inductor L2, and to attain a stable lighting of the discharge lamp Z' particularly over to an extremely low dimming level.

Figure 24:
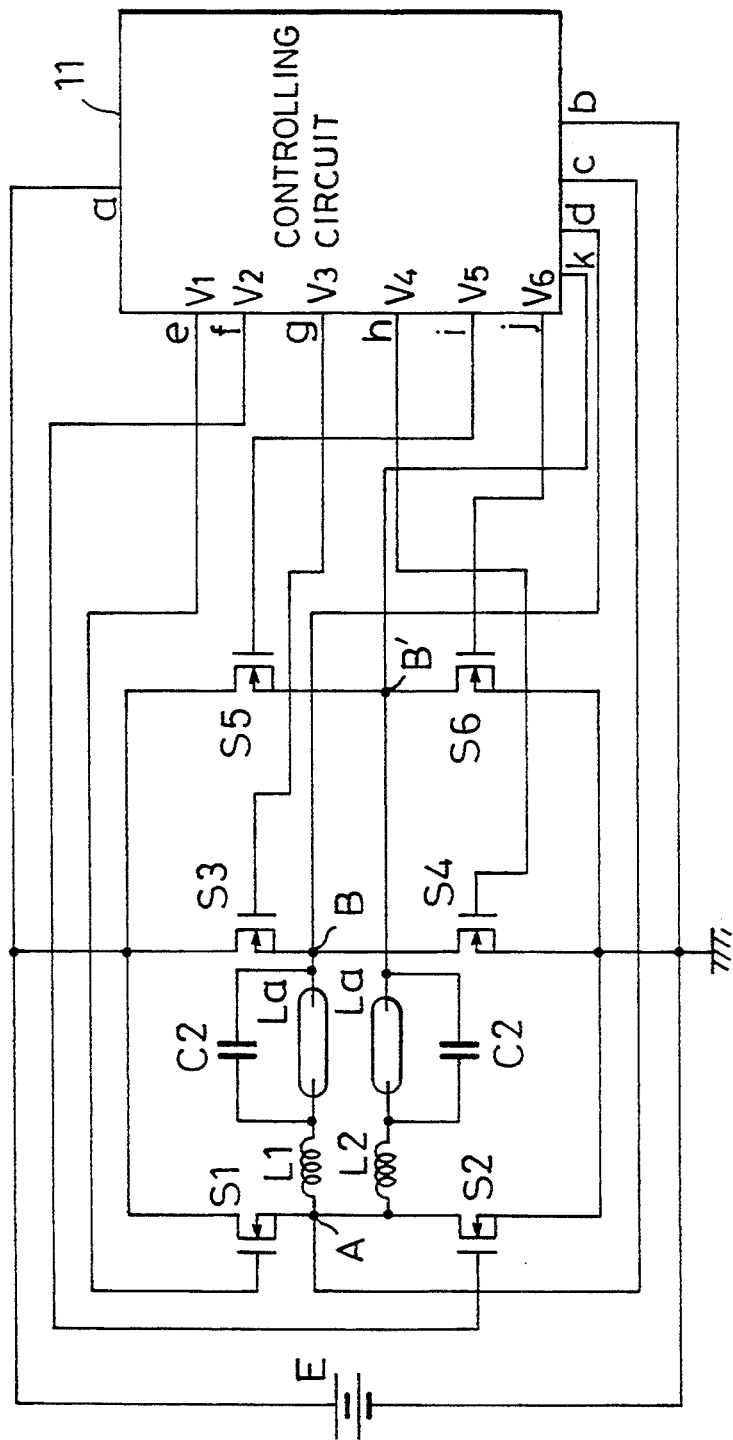
Figure 25:
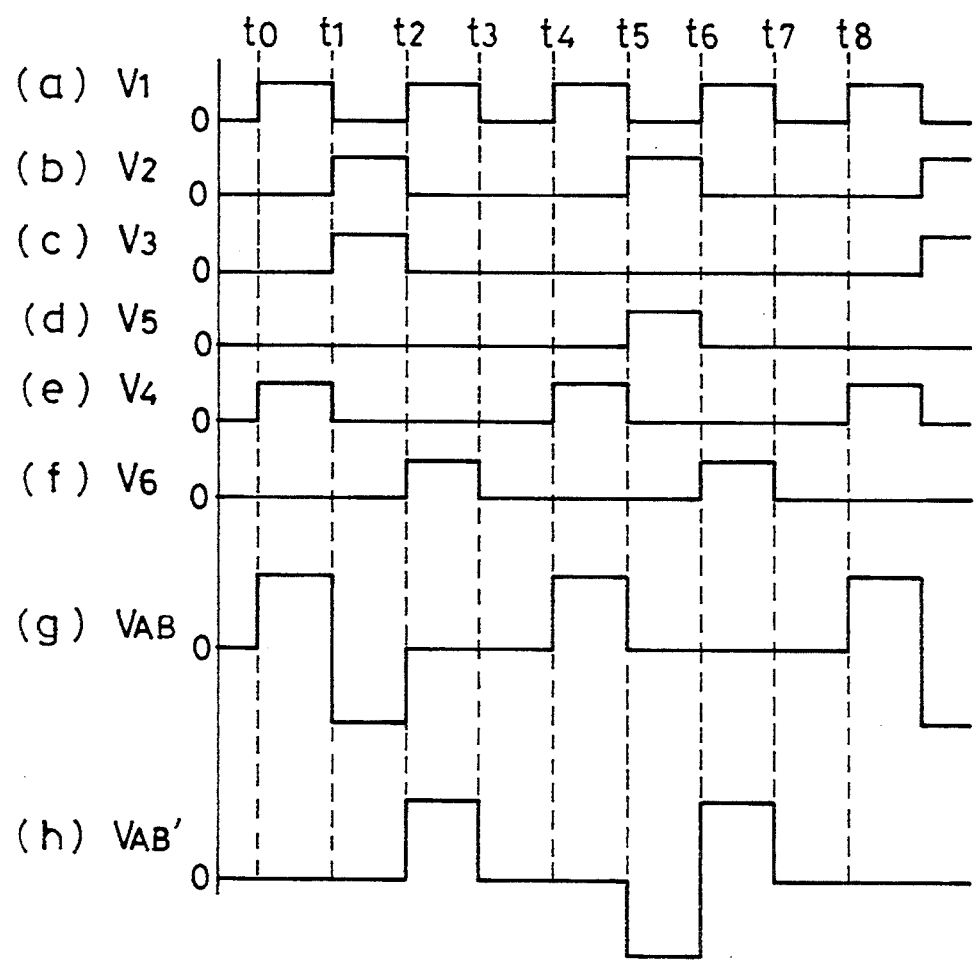
FIGS. 25 and 26 are explanatory diagrams for working aspects of the device in the embodiment of FIG. 24 of the present invention.

Referring to FIG. 24, there is shown another embodiment of the discharge lamp lighting device for a plurality of the discharge lamps according to the present invention, in which in particular the switching elements S1-S6 are individually controlled by the control circuit 11. Referring to a working aspect of this device of FIG. 24 with reference also to FIG. 25, the switching elements S1 and S4 are made ON from time t0 to time t1, the switching elements S2 and S3 are ON from t1 to t2, the switching elements S1 and S6 are ON from t2 to t3, all switching elements S1-S6 are ON from t3 to t4, the switching elements S1 and S4 are ON from t4 to t5, the switching elements S2 and S5 are ON from t5 to t6, the switching elements S1 and S6 are ON from t6 to t7, and all switching elements S1-S6 are ON from t7 to t8. With this series of operation repeated, the paired switching elements S3, S5 and S4, S6 are alternately made ON, so that the lighting control of a plurality of the discharge lamps L and L' can be realized through the same operation as that in the foregoing discharge lamp lighting device for the single discharge lamp.

Figure 26:
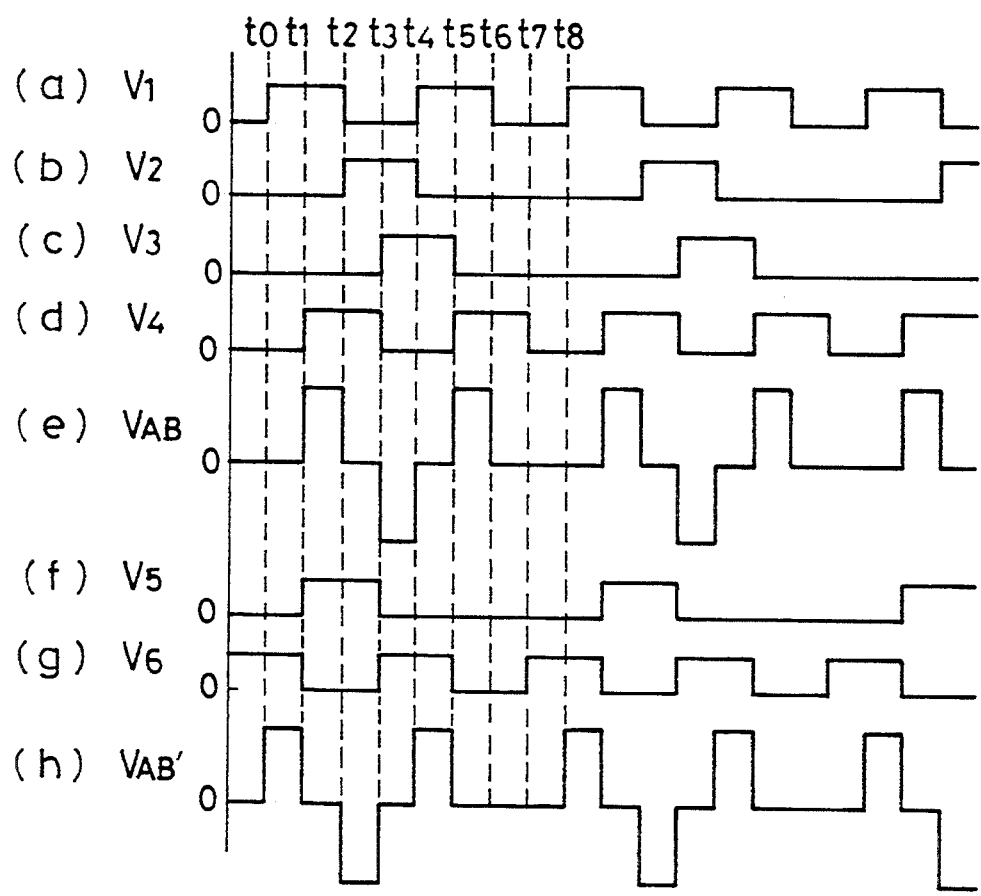

FIG. 26 shows another working aspect of the device shown in FIG. 24, in which the switching element S6 is made ON in a former half of ON period of the switching element S1 while the switching element S4 is made ON in a latter half of this ON period, and the switching element S5 is made ON in a former half of ON period of the switching element S2 while the switching element S3 is made ON in a latter half of the same ON period. That is, the switching phase of the switching elements S3 and S4 is delayed by 90 degrees with respect to the switching phase of the switching elements S1 and S2, and the switching elements S5 and S6 are also delayed in the switching phase by 90 degrees, so that the lighting control of the plurality of discharge lamps can be realized through the same operation as that in the foregoing lighting device for the single discharge lamp.

It should be readily appreciated that, in FIGS. 2-10, 12, 13, 16-18, 21, 22, 25 and 26, the waveforms denoted by a reference code $V_{AB}$ represent applied voltages to the circuit including the load circuit having the discharge lamp between the two sets of the switching elements. Further, in FIGS. 11, 23 and 24, the switching elements S1-S6 are shown in the form of FETs and the description of the respective working aspects has been also made with a premise that FETs are employed. In place of FET, however, the use of switching circuit formed by connecting a diode in inverse parallel to a bipolar transistor, thyristor or the like also allows the same operation to be executed. Further, while in the respective embodiments the references has been made to the use of the DC power source E, it is of course possible to employ a rectified source power obtained with an AC source power rectified.

What is claimed is:

1. A discharge lamp lighting device comprising a DC power source having first and second terminals, a first series circuit including first and second switching elements and connected between said first and second terminals of said DC power source, a second series circuit including third and fourth switching elements and connected between said first and second terminals of said DC power source, a load circuit connected between a first connecting point connecting said first and second switching elements and a second connecting point connecting said third and fourth switching elements and comprising at least an LC resonance circuit and a discharge lamp as a load, and control means for variably altering ON/OFF timing of said first and second switching elements of said first series circuit in a range from an in-phase state to a 180 degrees phase-shifted state with respect to the ON/Off timing of said third and fourth switching elements in said second series circuit, said control means comprising means for alternately turning ON and OFF said first and second switching elements with a first zero-voltage period interposed for preventing said first and second switching elements from simultaneously turning ON, means for alternately turning ON and OFF said third and fourth switching elements with a second zero-voltage period, different from the first zero voltage period, interposed for preventing said third and fourth switching elements from simultaneously turning ON, wherein the ON/OFF cycle of said first series circuit is substantially identical to the ON/OFF cycle of said second series circuit, and means for generating a first ON period ratio of said first and second switching elements and for a generating a second ON period ratio of said third and fourth switching elements, the second ON period ratio being different from the first ON period ratio.

2. The device according to claim 1 wherein said means for alternately turning ON and OFF and said means for variably altering ON/OFF timing are set to alter the ON/OFF timing of said switching elements in one of said first and second series circuits in a phase-shifted state in the range with respect to the ON/OFF timing of said switching elements in the other of said first and second series circuits.

3. The device according to claim 2, wherein said phase-shifted state is an advanced state.

4. The device according to claim 2, wherein said phase-shifted state is a delayed state.

5. A discharge lamp lighting device comprising a DC power source having first and second terminals, a first series circuit including first and second switching elements and connected between said first and second terminals of said DC power source, a second series circuit including third and fourth switching elements and connected between said first and second terminals of said DC power source, a load circuit connected between a first connecting point connecting said first and second switching elements and a second connecting point connecting said third and fourth switching elements and comprising at least an LC resonance circuit and a discharge lamp as a load, and control means for variably altering ON/OFF timing of said first and second switching elements of said first series circuit in a range from an in-phase state to a 180 degrees phase-shifted state with respect to the ON/OFF timing of said third and fourth switching elements in said second series circuit, said control means comprising means for alternately turning ON and OFF said first and second switching elements with a first zero-voltage period interposed for preventing said first and second switching elements from simultaneously turning ON, means for alternately turning ON and OFF said third and fourth switching elements with a second zero-voltage period, different than the first zero voltage period, interposed for preventing said third and fourth switching elements from simultaneously turning ON, wherein the ON/OFF cycle of said first series circuit is substantially identical to the ON/OFF cycle of said second series circuit, and means for generating a first ON period ratio of said first and second switching elements and for generating a second ON period ratio of said third and fourth switching elements, the second ON period ratio being different from the first ON period ratio, wherein said means for alternately turning ON and OFF and said means for variably altering ON/OFF timing are set to alter the ON/OFF timing of said switching elements in said one of said first and second series circuits in a phase-shifted state in the range with respect to the ON/OFF timing of said switching elements in the other of said first and second series circuits, and said means for generating the first and second period ratios enlarges the ON period ratio of said switching elements in said one of said first and second series circuits in accordance with a phase difference due to the phase-shifted state of the ON/OFF timing.

6. The device according to claim 5 wherein said means for generating the first and second ON period ratios varies an ON period ratio of said switching elements in said other of said first and second series circuits when the ON period ratio of said two switching elements in said one of said first and second series circuits is varied so that power supplied to said load is substantially constant.

7. The device according to claim 1 wherein said means for alternately turning ON and OFF turns 0N and OFF respective switching elements of said first and second series circuits to differentiate in switching cycle between said switching elements at diagonally opposing positions.

8. The device according to claim 6 wherein any fluctuation in a source voltage from said DC power source is detected and the phase-shifted state between said switching elements of said first and second series circuits is regulated in accordance with any fluctuation detected.

9. A discharge lamp lighting device comprising a DC power source having first and second terminals, a first series circuit including first and second switching elements and connected between said first and second terminals of said DC power source, a second series circuit including third and fourth switching elements and connected between said first and second terminals of said DC power source, a load circuit connected between a first connecting point connecting said first and second switching elements and a second connecting point connecting said third and fourth switching elements and comprising at least an LC resonance circuit and a discharge lamp as a load, and control means for variably altering ON/OFF timing of said first and second switching elements of said first series circuit in a range from an in-phase state to a 180 degrees phase-shifted state with respect to the ON/Off timing of said third and fourth switching elements in said second series circuit, said control means comprising means for alternately turning ON and OFF said first and second switching elements with a first zero-voltage period interposed for preventing said first and second switching elements from simultaneously turning ON, means for alternately turning ON and OFF said third and fourth switching elements with a second zero-voltage period, different from the first zero voltage period, interposed for preventing said third and fourth switching elements from simultaneously turning ON, wherein the ON/OFF cycle of said first series circuit is substantially identical to the ON/OFF cycle said second series circuits, and means for generating a first ON period ratio of said first and second switching elements and for a generating a second ON period ratio of said third and fourth switching elements, the second ON period ratio being different from the first ON period ratio, wherein said means for alternately turning ON and OFF turns ON and OFF respective switching elements of said first and second series circuits to differentiate in switching cycle between said switching elements at diagonally opposing positions, and any fluctuation in a source voltage from said DC power source is detected and the phase-shifted state between said switching elements of said first and second series circuits is regulated in accordance with any fluctuation detected.

10. The device according to claim 2 wherein a load current is detected to determine any fluctuation therein, and the phase-shifted state between said switching elements of said first and second series circuits is regulated in accordance with any fluctuation detected to control current flowing through said load to be constant.

11. The device according to claim 1 including a plurality of loads connected between said first and second series circuits of said switching elements.

12. The device according to claim 1 wherein said switching elements in said other of said first and second series circuits are not mutually and simultaneously turned ON and OFF.

13. The device according to claim 1 wherein said switching elements are switched at a frequency higher than a resonance frequency of said LC resonance circuit at least when said discharge lamp is not lit, the switching frequency being closer to the resonance frequency of the LC resonance circuit upon starting of said discharge lamp.

14. The device according to claim 2 wherein said switching elements are switched at a frequency higher than a resonance frequency of said LC resonance circuit at least when said discharge lamp is not lit, and the phase-shifted state in the ON/OFF timing of said switching elements between said first and second series circuits is produced upon starting of said discharge lamp.

15. The device according to claim 1 wherein said load includes first and second discharge lamps.

16. A discharge lamp lighting device comprising:
a direct current (DC) power source;
first and second switching elements serially connected across the DC power source, the first and second switching elements being connected together at a first connection node;
third and fourth switching elements serially connected across the DC power source, the third and fourth switching elements being connected together at a second connection node;
a load, including a discharge lamp, connected between the first and second connection nodes; and
a control circuit, controlling the first and fourth switching elements to be ON and the second and third switching elements to be OFF in a first state, and controlling the first and fourth switching elements to be OFF and the second and third switching elements to be ON in a second state, controlling the first, second, third, and fourth switching elements for spacing, in time, the first state in time from the second state by generating a first zero voltage state immediately after the first state and a second zero voltage state immediately after the second state, for successively applying a positive DC voltage to the load during the first state, no voltage to the load during the first zero voltage state, a negative DC voltage to the load during the second state, and no voltage to the load during the second zero voltage state, duration of the first state being different from duration of the second state and duration of the first zero voltage state being different from duration of the second zero voltage state, ON/OFF timing of the first and second switching elements having a variable phase difference with respect to ON/OFF timing of the third and fourth switching elements, the variable phase difference varying from in-phase to 180 degrees out of phase, thereby maintaining lighting of the discharge lamp in a dimming state by applying DC components to the discharge lamp, for reducing flicker due to migration, reducing power supplied to the discharge lamp, and expanding a dimming range of the discharge lamp while maintaining stable operation.

17. The device according to claim 16 wherein a difference between the ON periods of the first and second switching elements varies in accordance with the phase difference.

* * * * *